United States Patent
Hudda et al.

(10) Patent No.: US 11,368,530 B2
(45) Date of Patent: *Jun. 21, 2022

(54) ADOPTING DATA ACROSS DIFFERENT SITES

(71) Applicant: eBay Inc., San Jose, CA (US)

(72) Inventors: Syeda Hudda, San Ramon, CA (US); Jeffrey K. Cavano, San Jose, CA (US); Naveen Kumar, Campbell, CA (US); Abdullah Rababah, San Jose, CA (US); Vineet Bindal, San Jose, CA (US); Girish Kini, San Jose, CA (US); Pramod Mahadev Mamidipudi, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/076,083

(22) Filed: Oct. 21, 2020

(65) Prior Publication Data

US 2021/0037094 A1 Feb. 4, 2021

Related U.S. Application Data

(63) Continuation of application No. 16/538,295, filed on Aug. 12, 2019, now Pat. No. 10,855,762, which is a
(Continued)

(51) Int. Cl.
*H04L 67/1095* (2022.01)
*H04L 67/02* (2022.01)
(Continued)

(52) U.S. Cl.
CPC ........ *H04L 67/1095* (2013.01); *G06F 16/957* (2019.01); *G06Q 30/0282* (2013.01);
(Continued)

(58) Field of Classification Search
CPC ..... H04L 67/1095; H04L 67/02; H04L 67/20; H04L 67/42; G06F 16/957; G06Q 30/0282

See application file for complete search history.

(56) References Cited

U.S. PATENT DOCUMENTS 7,149,698 B2 12/2006 Guheen et al.
7,660,740 B2 2/2010 Boone et al.
(Continued)

FOREIGN PATENT DOCUMENTS

CN 1838121 A 9/2006
CN 102224520 A 10/2011
(Continued)

OTHER PUBLICATIONS

Office Action received for Chinese Patent Application No. 201780021732.0 dated Apr. 22, 2021, 12 pages (2 Pages of English translation and 10 Pages of Official Copy).
(Continued)

*Primary Examiner* — SM A Rahman
(74) *Attorney, Agent, or Firm* — Schwegman Lundberg & Woessner, P.A.

(57) ABSTRACT

Systems and methods of adopting data across different sites are disclosed. In some example embodiments, a data adoption system configures a first networked site to adopt data from one or more other networked sites, detects new data on the other networked site(s), with the new data being associated with a data item on the other networked site(s), determines that a record of the data item is being stored on the first networked site, and stores the new data from the other networked site(s) on the first networked site in association with the data item based on the detecting of the new
(Continued)

data on the other networked site(s) and the determining that a record of the data item is being stored on the first networked site.

20 Claims, 17 Drawing Sheets

Related U.S. Application Data continuation of application No. 15/488,160, filed on Apr. 14, 2017, now Pat. No. 10,412,162.

(60) Provisional application No. 62/323,472, filed on Apr. 15, 2016.

(51) Int. Cl.
*G06F 16/957* (2019.01)
*H04L 67/01* (2022.01)
*H04L 67/53* (2022.01)
*G06Q 30/02* (2012.01)

(52) U.S. Cl.
CPC .............. *H04L 67/02* (2013.01); *H04L 67/20* (2013.01); *H04L 67/42* (2013.01)

(56) References Cited

U.S. PATENT DOCUMENTS

| | | | |
|---|---|---|---|
| 7,664,669 B1 | 2/2010 | Adams et al. | |
| 8,069,057 B2 | 11/2011 | Choubey et al. | |
| 10,412,162 B2 | 9/2019 | Hudda et al. | |
| 10,855,762 B2 | 12/2020 | Hudda et al. | |
| 2003/0187933 A1* | 10/2003 | Beavin | H04L 69/329 709/205 |
| 2006/0129446 A1 | 6/2006 | Ruhl et al. | |
| 2010/0077098 A1 | 3/2010 | Fox et al. | |
| 2012/0017146 A1 | 1/2012 | Travieso et al. | |
| 2012/0191559 A1 | 7/2012 | Wood | |
| 2012/0276396 A1 | 11/2012 | Nashiki et al. | |
| 2013/0117361 A1 | 5/2013 | Dolin et al. | |
| 2013/0246184 A1 | 9/2013 | Flood et al. | |
| 2014/0067559 A1* | 3/2014 | Tirk | G06Q 30/0274 709/217 |
| 2014/0075004 A1 | 3/2014 | Van Dusen et al. | |
| 2015/0254762 A1 | 9/2015 | Fisher | |
| 2015/0378685 A1* | 12/2015 | Kaplinger | G06F 16/957 717/104 |
| 2017/0302736 A1 | 10/2017 | Hudda et al. | |
| 2020/0045107 A1 | 2/2020 | Hudda et al. | |

FOREIGN PATENT DOCUMENTS

| | | |
|---|---|---|
| CN | 104281700 A | 1/2015 |
| KR | 10-2006-0086658 A | 8/2006 |
| KR | 10-1596407 B1 | 2/2016 |
| WO | 2017/181096 A1 | 10/2017 |

OTHER PUBLICATIONS

Extended European Search Report Received for European Patent Application No. 21167611.9, dated Jun. 22, 2021, 9 Pages.
U.S. Appl. No. 15/488,160 U.S. Pat. No. 10,412,162, filed Apr. 14, 2017, Adopting Data Across Different Sites.
U.S. Appl. No. 16/538,295 U.S. Pat. No. 10,855,762, filed Aug. 12, 2019, Adopting Data Across Different Sites.
Office Action Received for Korean Patent Application No. 10-2018-7032993, dated May 29, 2020, 11 pages (6 pages of Official copy and 5 pages of English Translation).
Response to Office Action filed on Aug. 27, 2020 for Korean Patent Application No. 10-2018-7032993, dated May 29, 2020, 23 pages (18 pages of Official copy & 5 pages of English Translation of claims).
First Action Interview-Pre Interview Communication received for U.S. Appl. No. 15/488,160 dated Jan. 28, 2019, 12 pages.
Notice of Allowance received for U.S. Appl. No. 15/488,160,dated Apr. 29, 2019, 14 pages.
Response to Pre-Interview Communication Filed on Mar. 28, 2019 for U.S. Appl. No. 15/488,160 dated Jan. 28, 2019, 8 pages.
Corrected Notice of Allowability received for U.S. Appl. No. 16/538,295, dated Oct. 15, 2020, 2 pages.
Corrected Notice of Allowability Received for U.S. Appl. No. 16/538,295, dated Sep. 3, 2020, 2 pages.
Corrected Notice of Allowability received for U.S. Appl. No. 16/538,295, dated Oct. 30, 2020, 2 pages.
Notice of Allowance received for U.S. Appl. No. 16/538,295, dated Jul. 14, 2020, 13 pages.
Preliminary Amendment filed on Oct. 23, 2019 for U.S. Appl. No. 16/538,295, 7 pages.
Extended European Search Report Received for European Patent Application No. 17783302.7, dated Oct. 15, 2019, 8 pages.
Response to Extended European Search Report Filed on Feb. 28, 2020, for European Patent Application No. 17783302.7, dated Oct. 15, 2019, 29 pages.
Office Action Received for Chinese Patent Application No. 201780021732.0, dated Sep. 29, 2020, 22 pages (10 pages official copy and 12 pages English translation).
Voluntary Amendment filed on Mar. 25, 2019, for Chinese Patent Application No. 201780021732.0, dated Mar. 25, 2019, 58 pages (57 pages official copy and 1 page Concise Statement of Relevance Under 37 CFR 1.98(a)(3)(i)).
Anonymous, "Amazon.com Help: Edit Your Reviews", Retrieved from the Internet: URL:<https://web.archive.org/web/20160412163033/ https://www.amazon.com/gp/help/customer/display html?nodeId=16465311>, [Retrieved on Oct. 8, 2019], XP055629878, Apr. 12, 2016, 2 pages.
Anonymous, "Top-level domain—Wikipedia, the free encyclopedia", Retrieved from the Internet: URL:https://web.archive.org/web/20160414073603/https://en.wikipedia.org/wiki/Top-level_domain, [Retrieved on Oct. 8, 2019], XP055629825, Apr. 14, 2016, 9 pages.
International Written Opinion received for PCT Application No. PCT/US2017/027748, dated Jun. 27, 2017, 5 pages.
International Search Report received for PCT Application No. PCT/US2017/02//48, dated Jun. 27, 2017, 3 pages.
International Preliminary Report on Patentability Received for PCT Application No. PCT/US2017/027748 dated Oct. 25, 2018, 7 pages.
Office Action received for Korean Patent Application No. 10-2021-7012132 dated Jul. 29, 2021, 6 pages (5 pages of official copy and 1 page of English translation).
Notice of Decision to Grant received for Chinese Patent Application No. 201780021732.0, dated Sep. 30, 2021, 7 pages (4 pages of official copy and 3 pages of English translation).

\* cited by examiner

INTERNATIONAL SHIPPING

☐ USE THE GLOBAL SHIPPING PROGRAM
SEND YOUR ITEM TO THE US SHIPPING CENTER WHEN IT SELLS. LEARN MORE

410 — SPECIFY INTERNATIONAL SHIPPING COSTS. LEARN MORE

CALCULATED: COST VARIES BY BUYER LOCATION ⇔

SHIP TO             SERVICES        CALCULATE SHIPPING

CHOOSE CUSTOM LOCATION ⇔

420 —

☐ N. AND S. AMERICA   ☐ EUROPE           ☐ ASIA
☐ CANADA              ☐ UNITED KINGDOM   ☐ CHINA
☐ MEXICO              ☐ GERMANY          ☐ JAPAN
☐ BRAZIL              ☐ FRANCE           ☐ AUSTRALIA

REQUIRE BUYERS TO CONTACT YOU FOR INTERNATIONAL SHIPPING COSTS

WILL SHIP TO THE UNITED STATES AND THE FOLLOWING ⇔

☐ N. AND S. AMERICA   ☐ EUROPE           ☐ ASIA
☐ CANADA              ☐ UNITED KINGDOM   ☐ CHINA
☐ MEXICO              ☐ GERMANY          ☐ JAPAN
☐ BRAZIL              ☐ FRANCE           ☐ AUSTRALIA

WHEN YOU OFFER INTERNATIONAL SHIPPING, YOUR ITEM COULD BE SOLD ON AN EBAY SITE OTHER THAN EBAY.COM. IN THIS CASE, YOUR LISTING IS SUBJECT TO THE POLICIES AND BUYER PROTECTION PROGRAM FOR THAT SITE.

ADOPTING DATA ACROSS DIFFERENT SITES

CROSS-REFERENCE TO RELATED APPLICATIONS

This application is a continuation of U.S. application Ser. No. 16/538,295, filed Aug. 12, 2019, which is a continuation of U.S. application Ser. No. 15/488,160, filed Apr. 14, 2017, which claims the benefit of priority under 35 U.S.C. Section 119(e), to U.S. Provisional Application No. 62/323,472, filed Apr. 15, 2016, each of which is hereby incorporated by reference in its entirety.

TECHNICAL FIELD

Embodiments of the present disclosure relate to systems and methods of adopting data across different networked sites.

BACKGROUND

Limited availability of data can hinder the ability of a networked site (e.g., a website) to provide services to its users. For example, currently, in situations where a local site adopts and displays one type of information about or for a data item from a peer site, other types of information about or for the data item may not be displayed or otherwise made available on the local site, as the local site may only provide the other types of information for data items that originated on the local site. This data deficiency impacts sites whose inventory is primarily from another site or imported (e.g., by GSP or CBT). As a result of this data deficiency, the usability of these other sites is reduced, as it becomes more difficult for users to find information.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 4 illustrates a user interface (UI) displaying selectable user options for a seller of an item listing to use a global shipping program or cross-border trade, in accordance with some example embodiments.

DETAILED DESCRIPTION

Figure 1:
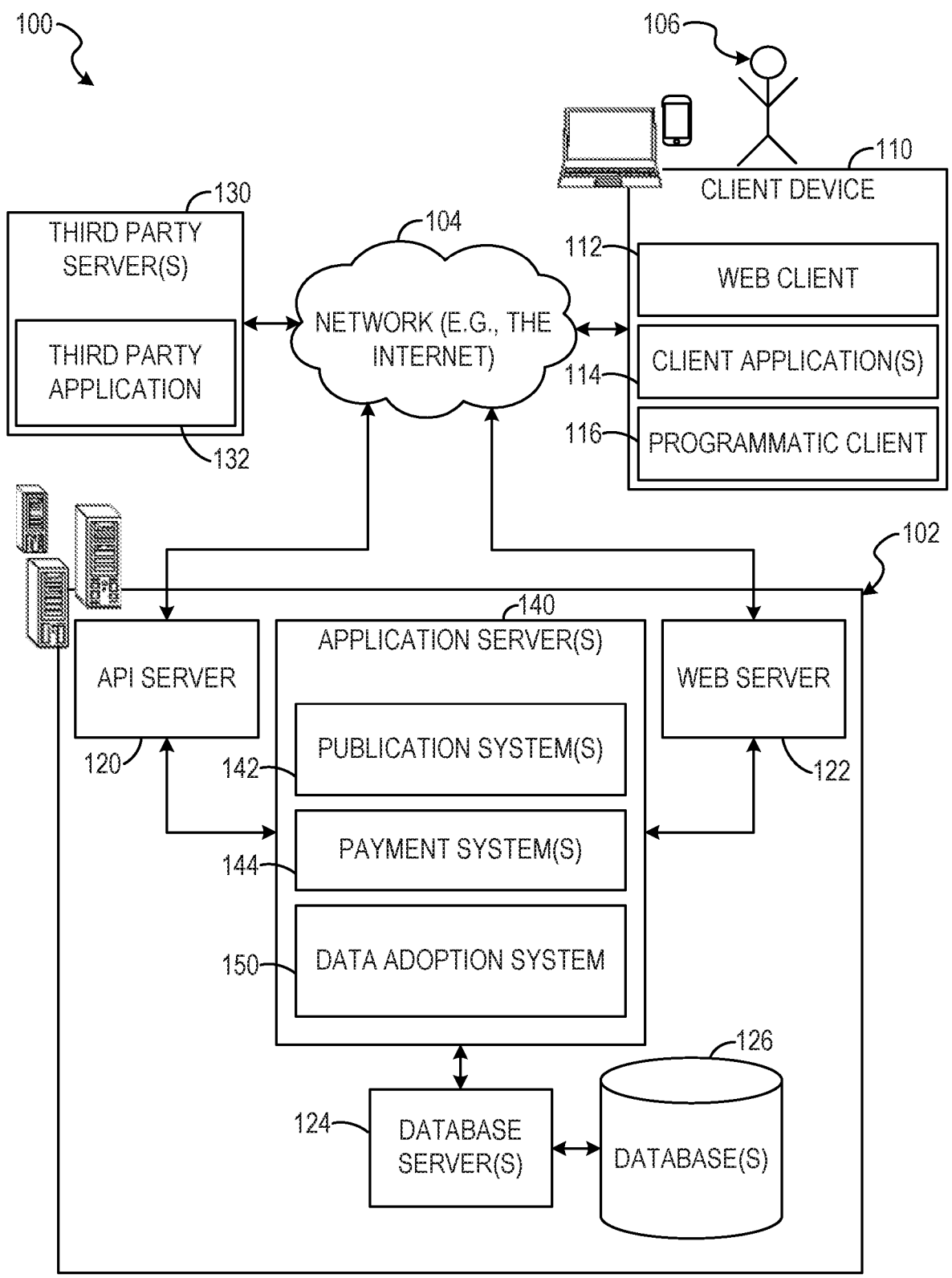
FIG. 1 is a block diagram illustrating a networked system, in accordance with some example embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

The present disclosure provides technical solutions for adopting data across different sites (e.g. websites). In some example embodiments, a local site is configured to adopt data from one or more peer sites. For example, a site administrator can configure a website to adopt data from corresponding international versions of the website, such as a U.S. site being configured to adopt product reviews and other data from a corresponding Canadian site, a corresponding United Kingdom site, and a corresponding German site. As a result, when a product review is generated, stored, and published for a product on any one of the corresponding Canadian, United Kingdom, and German sites, that product review can be adopted by the United States site for the same product listed on the United States site, such that the adopted product review will be published on the United States site in association with that product.

The term "local site" is used herein to refer to any site that adopts data (e.g., an item listing or a product review) from another site. The term "peer site" is used herein to refer to any site from which data is adopted by another site. An online site can be both a local site and a peer site, depending on the context in which the online site is being discussed (e.g., whether the online site is adopting data from another site or another site is adopting data from the online site).

In some example embodiments, operations are performed by a machine having a memory and at least one hardware processor, with the operations comprising configuring a first networked site to adopt data from one or more other networked sites different from the first networked site, detecting new data on at least one of the one or more other networked sites, with the new data being associated with a data item on the at least one of the one or more other networked sites, determining that a record of the data item is being stored on the first networked site, and storing the new data from the at least one of the one or more other networked sites on the first networked site in association with the data item based on the detecting of the new data on the at least one of the one or more other networked sites and the determining that a record of the data item is being stored on the first networked site. In some example embodiments, the data item is a product identification.

In some example embodiments, the first networked site and each one of the one or more other networked sites has a corresponding top-level domain, the top-level domain of each one of the one or more other networked sites being different from the top-level domain of the first networked site. In some example embodiments, the top-level domain of each one of the one or more other networked sites corresponds to a different country than the top-level domain of the first networked site.

In some example embodiments, the operations further comprise receiving, from a computing device of a user accessing the first networked site, a request to view information about the data item, retrieving the new data stored on the first networked site in association with the data item, and displaying the retrieved new data on the first networked site. In some example embodiments, the operations further comprise determining a type of page on which the new data is displayed on the at least one of the one or more other networked sites, the retrieved new data being displayed on the same type of page on the first networked site. In some example embodiments, the operations further comprise determining a position in which to display the retrieved new data on the first networked site, the position being based at least in part on the new data having originated from the at least one of the one or more other networked sites, and displaying the retrieved new data in the determined position on the first networked site.

In some example embodiments, the new data comprises a review of the product. In some example embodiments, the operations further comprise receiving, by the first networked site from a user on a computing device accessing the first networked site, a request to submit a new review of a product, determining, by the first networked site, that the user has previously submitted a review of the product on one of the one or more other networked sites, and based on the determining that the user has previously submitted the review of the product on the one of the one or more other networked sites, preventing, by the first networked site, the user from submitting the new review of the product. In some example embodiments, the operations further comprise displaying a prompting on the first networked site for the user to edit the previously submitted review based on the determining that the user has previously submitted the review of the product on the one of the one or more other networked sites.

In some example embodiments, the configuring the first networked site to adopt data from the one or more other networked sites comprises configuring the first networked site to adopt data of a first type from the one or more other networked sites, and configuring the first networked site not to adopt data of a second type from the one or more other networked sites, the second type being different from the first type. In some example embodiments, the first type of data is a first type of product review and the second type of data is a second type of product review.

The methods or embodiments disclosed herein can be implemented as a computer system having one or more modules (e.g., hardware modules or software modules). Such modules can be executed by one or more hardware processors of the computer system. The methods or embodiments disclosed herein can be embodied as instructions stored on a machine-readable medium that, when executed by one or more processors, cause the one or more processors to perform the instructions.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142, payment systems 144, and data adoption system 150, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The data adoption system 150 provides functionality operable to perform various data adoption operations, as will be discussed in further detail below. The data adoption system 150 may access the data from the databases 126, the third party servers 130, the publication system 142, and other sources. In some example embodiments, the data adoption system 150 may analyze the data to perform data adoption operations. In some example embodiments, the data adoption system 150 communicates with the publication systems 142 (e.g., accessing item listings) and payment system 144. In an alternative embodiment, the data adoption system 150 is a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and data adoption system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
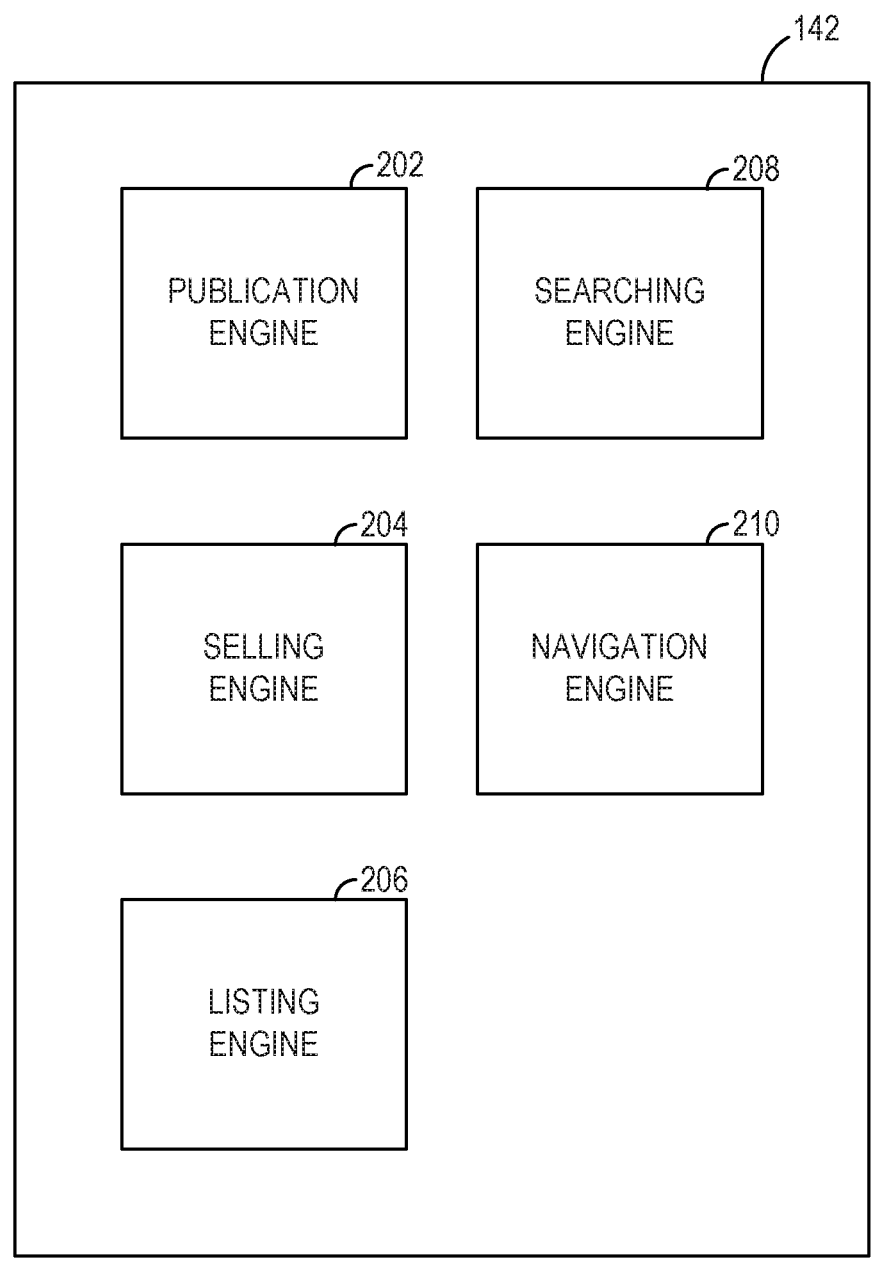
FIG. 2 is a block diagram illustrating various components of a network-based publication system, in accordance with some example embodiments.

FIG. 2 is a block diagram illustrating various components of the network-based publication system 142, in accordance with some example embodiments. The publication system 142 can be hosted on dedicated or shared server machines that are communicatively coupled to enable communications between server machines. The components themselves are communicatively coupled (e.g., via appropriate interfaces) to each other and to various data sources, so as to allow information to be passed between the components or so as to allow the components to share and access common data. Furthermore, the components can access one or more databases 126 via the database servers 124.

The publication system 142 can provide a number of publishing, listing, and/or price-setting mechanisms whereby a seller (also referred to as a first user) can list (or publish information concerning) goods or services for sale or barter, a buyer (also referred to as a second user) can express interest in or indicate a desire to purchase or barter such goods or services, and a transaction (such as a trade) can be completed pertaining to the goods or services. To this end, the publication system 142 can comprise at least one publication engine 202 and one or more selling engines 204. The publication engine 202 can publish information, such as item listings or product description pages, on the publication system 142. In some embodiments, the selling engines 204 can comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines can also provide a number of features in support of these auction-format listings, such as a reserve price feature whereby a seller can specify a reserve price in connection with a listing and a proxy-bidding feature whereby a bidder can invoke automated proxy bidding. The selling engines 204 can further comprise one or more deal engines that support merchant-generated offers for products and services.

A listing engine 206 allows sellers to conveniently author listings of items or authors to author publications. In one embodiment, the listings pertain to goods or services that a user (e.g., a seller) wishes to transact via the publication system 142. In some embodiments, the listings can be an offer, deal, coupon, or discount for the good or service. Each good or service is associated with a particular category. The listing engine 206 can receive listing data such as title, description, and aspect name/value pairs. Furthermore, each listing for a good or service can be assigned an item identifier. In other embodiments, a user can create a listing that is an advertisement or other form of information publication. The listing information can then be stored to one or more storage devices coupled to the publication system 142 (e.g., databases 126). Listings also can comprise product description pages that display a product and information (e.g., product title, specifications, and reviews) associated with the product. In some embodiments, the product description page can include an aggregation of item listings that correspond to the product described on the product description page.

The listing engine 206 can also allow buyers to conveniently author listings or requests for items desired to be purchased. In some embodiments, the listings can pertain to goods or services that a user (e.g., a buyer) wishes to transact via the publication system 142. Each good or service is associated with a particular category. The listing engine 206 can receive as much or as little listing data, such as title, description, and aspect name/value pairs, that the buyer is aware of about the requested item. In some embodiments, the listing engine 206 can parse the buyer's submitted item information and can complete incomplete portions of the listing. For example, if the buyer provides a brief description of a requested item, the listing engine 206 can parse the description, extract key terms, and use those terms to make a determination of the identity of the item. Using the determined item identity, the listing engine 206 can retrieve additional item details for inclusion in the buyer item request. In some embodiments, the listing engine 206 can assign an item identifier to each listing for a good or service.

In some embodiments, the listing engine 206 allows sellers to generate offers for discounts on products or services. The listing engine 206 can receive listing data, such as the product or service being offered, a price and/or discount for the product or service, a time period for which the offer is valid, and so forth. In some embodiments, the listing engine 206 permits sellers to generate offers from the sellers' mobile devices. The generated offers can be uploaded to the publication system 142 for storage and tracking.

Searching the publication system 142 is facilitated by a searching engine 208. For example, the searching engine 208 enables keyword queries of listings published via the publication system 142. In example embodiments, the searching engine 208 receives the keyword queries from a device of a user and conducts a review of the storage device storing the listing information. The review will enable compilation of a result set of listings that can be sorted and returned to the client device 110 of the user. The searching engine 208 can record the query (e.g., keywords) and any subsequent user actions and behaviors (e.g., navigations).

The searching engine 208 also can perform a search based on the location of the user. A user can access the searching engine 208 via a mobile device and generate a search query. Using the search query and the user's location, the searching engine 208 can return relevant search results for products, services, offers, auctions, and so forth to the user. The searching engine 208 can identify relevant search results both in a list form and graphically on a map. Selection of a graphical indicator on the map can provide additional details regarding the selected search result. In some embodiments, the user can specify as part of the search query a radius or distance from the user's current location to limit search results.

The searching engine 208 also can perform a search based on an image. The image can be taken from a camera or imaging component of a client device or can be accessed from storage.

In a further example, a navigation engine 210 allows users to navigate through various categories, catalogs, or inventory data structures according to which listings can be classified within the publication system 142. For example, the navigation engine 210 allows a user to successively navigate down a category tree comprising a hierarchy of categories (e.g., the category tree structure) until a particular set of listings is reached. Various other navigation applications within the navigation engine 210 can be provided to supplement the searching and browsing applications. The navigation engine 210 can record the various user actions (e.g., clicks) performed by the user in order to navigate down the category tree.

Figure 3:
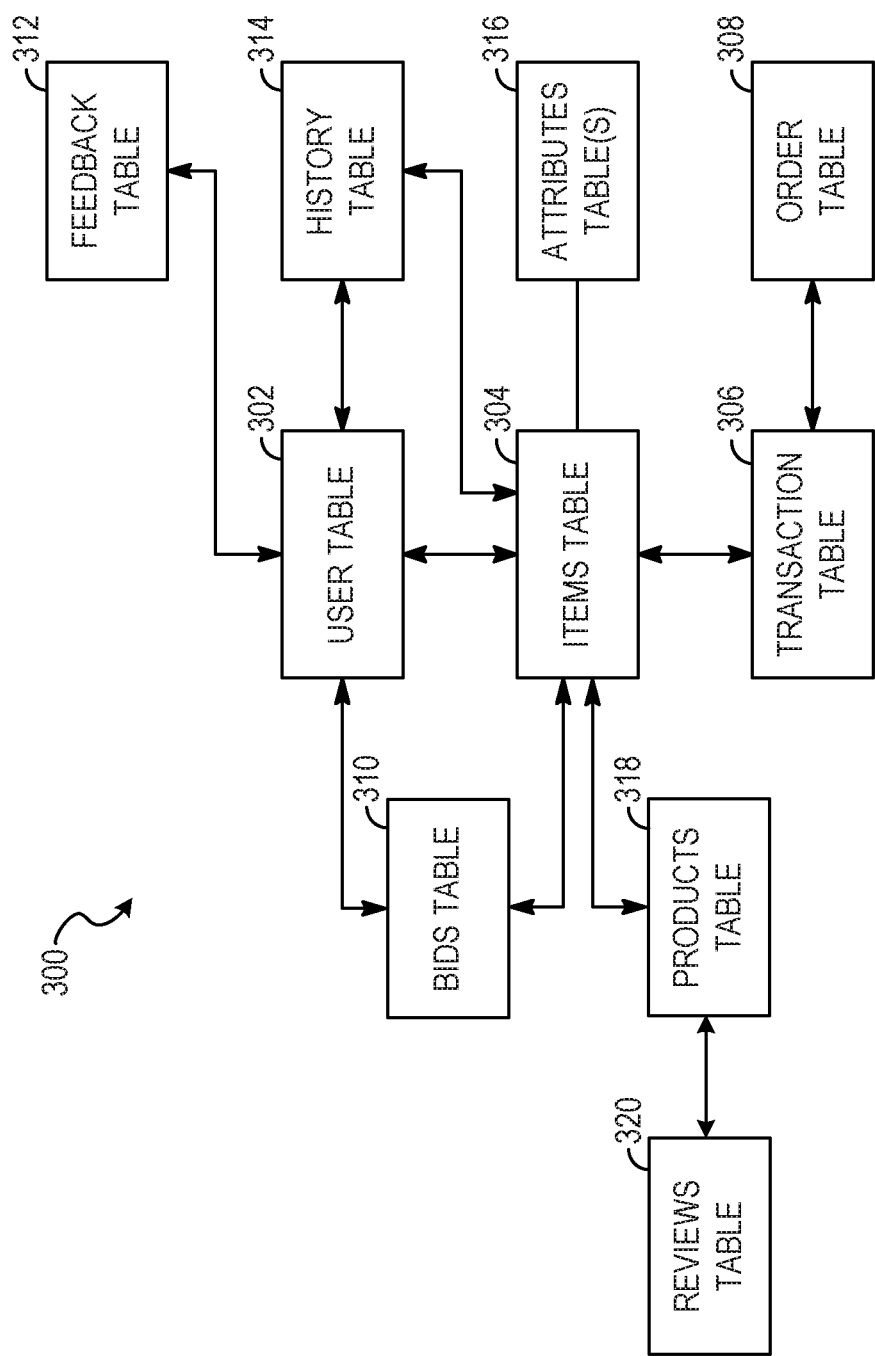
FIG. 3 is a block diagram illustrating various tables that can be maintained within a database, in accordance with some example embodiments.

FIG. 3 is a high-level entity-relationship diagram, illustrating various tables 300 that can be maintained within the database(s) 126, and that are utilized by and support the systems 142, 144, and 150. A user table 302 contains a record for each registered user of the networked system 102, and can include identifier, address and financial instrument information pertaining to each such registered user. A user can operate as a seller, a buyer, or both, within the networked system 102. In one example embodiment, a buyer can be a user that has accumulated value (e.g., commercial or proprietary currency), and is accordingly able to exchange the accumulated value for items that are offered for sale by the networked system 102.

The tables 300 also include an items table 304 in which are maintained item records for goods and services that are available to be, or have been, transacted via the networked system 102. Each item record within the items table 304 can furthermore be linked to one or more user records within the user table 302, so as to associate a seller and one or more actual or potential buyers with each item record.

A transaction table 306 contains a record for each transaction (e.g., a purchase or sale transaction) pertaining to items for which records exist within the items table 304.

An order table 308 is populated with order records, with each order record being associated with an order. Each order, in turn, can be associated with one or more transactions for which records exist within the transaction table 306.

Bid records within a bids table 310 each relate to a bid received at the networked system 102 in connection with an auction-format listing supported by an auction application. A feedback table 312 is utilized by one or more reputation applications, in one example embodiment, to construct and maintain reputation information concerning users. A history table 314 maintains a history of transactions to which a user has been a party. One or more attributes tables 316 record attribute information pertaining to items for which records exist within the items table 304. Considering only a single example of such an attribute, the attributes tables 316 can indicate a currency attribute associated with a particular item, with the currency attribute identifying the currency of a price for the relevant item as specified by a seller.

In some example embodiments, the tables 300 also include a products table 318 in which are maintained product records for goods and services that are available to be, or have been, transacted via the networked system 102. Each product record within the products table 318 can furthermore be linked to one or more user records within the user table 302, so as to associate a seller and one or more actual or potential buyers with each item record. In some example embodiments, a reviews table 320 is utilized by one or more review applications, in one example embodiment, to construct and maintain reviews concerning products. Such product reviews can be authored and submitted by users and can include, but are not limited to, text-based information describing a user's experience with the corresponding product, as well as one or more user-submitted ratings of the product, such as one or more graphical user interface elements that represent a rating (e.g., a star-based ratings system).

In some example embodiments, the data adoption system 150 is configured to aggregate, at a product identification (ID) level, product reviews entered and submitted for item listings. Product reviews are distinguished from seller reviews and buyers reviews in that product reviews are directed towards and meant to review a product, not a seller or a buyer. Accordingly, each product review can be associated in a database with a corresponding product (e.g., a corresponding product ID), such that all of the product reviews for a specific product can be aggregated and displayed in response to a request for product reviews for that specific product, as opposed to a request for reviews of a seller or a buyer.

In some example embodiments, mirror sites, such as websites that replicate and display item listings from another site, comprise the same catalog structure and product IDs as the other site from which the item listing is replicated.

Another situation when an item listing is adopted by an online site (local site) from another site (peer site) is when a global shipping program (GSP) is implemented by the peer site and selected by the seller of an item listing on the peer site, such as by the seller selecting a GSP option during the creation of the item listing for the peer site. When the seller selects the GSP option during item listing creation flow, it means that the seller will ship the item of the item listing to a local location, where the item will then be shipped by another party or entity (e.g., an agent of the parent site) to another country if the buyer is located in the other country, thus assisting the seller in selling and delivering the item to a buyer in a foreign country. Accordingly, this GSP-enabled item listing is published on all local sites that the GSP is supported on in addition to the original peer site on which the item listing was created, thereby reaching a greater pool of potential buyers than if the item listing was only published on the seller's peer site.

Another situation when an item listing is adopted by an online site (local site) from another site (peer site) is when cross-border trade (CBT) is implemented, where a seller of an item listing specifically selects the foreign countries that the seller will be responsible to ship to if there is a buyer from there. In that case, the item listing is published on those specific local sites (e.g., foreign sites) corresponding to the selected foreign countries, in addition to being published on the peer site from which the item listing originated.

FIG. 4 illustrates a UI 400 displaying selectable user options 410 and 420 for a seller of an item listing to use a global shipping program (GSP) or a cross-border trade (CBT) feature, respectively, in accordance with some example embodiments. In some example embodiments, selectable user options 410 and 420 comprise checkboxes, as shown in FIG. 4. However, other types of selectable UI elements are also within the scope of the present disclosure.

Figure 5:
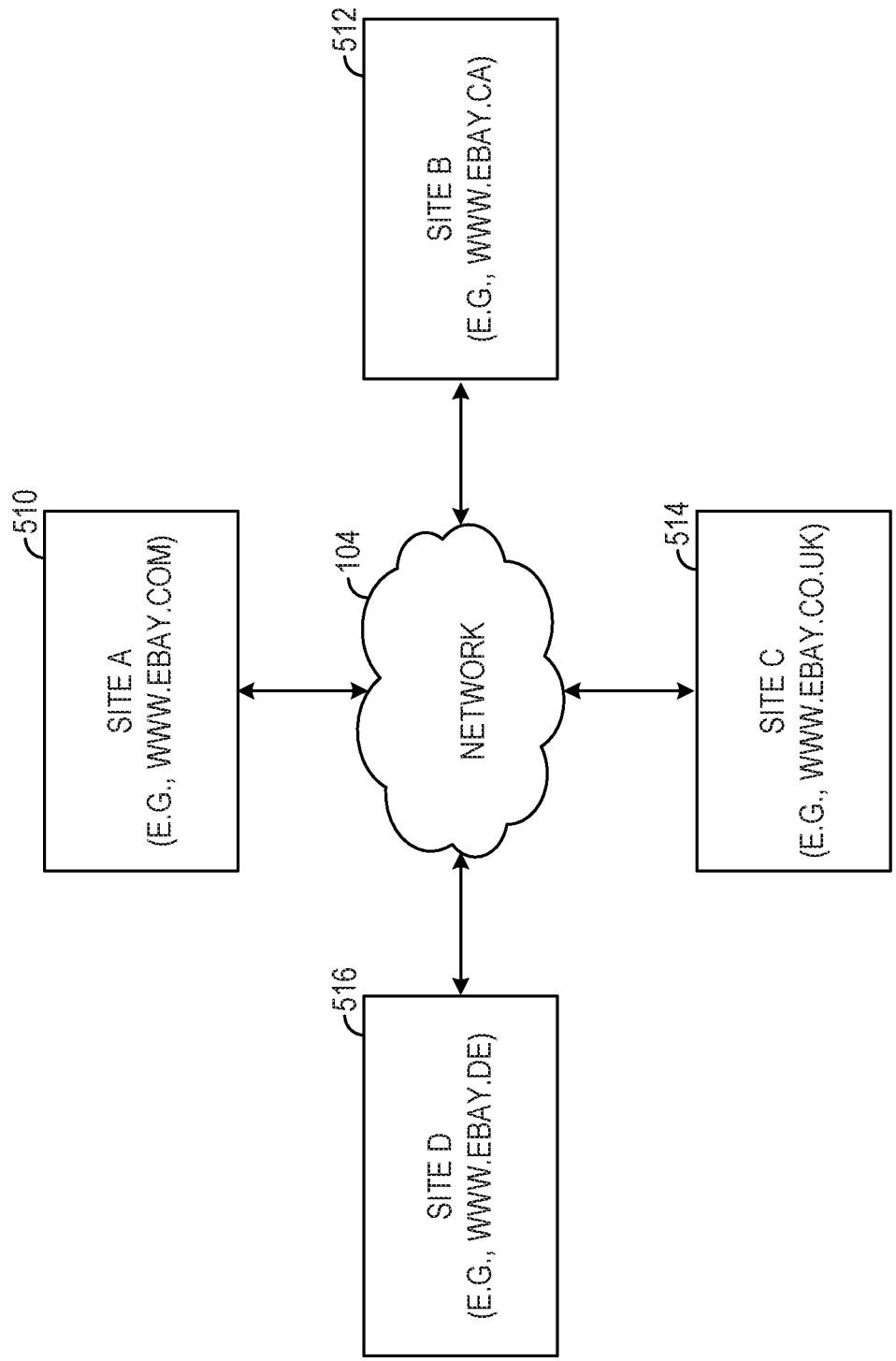
FIG. 5 is a block diagram illustrating different peer sites, in accordance with some example embodiments.

FIG. 5 is a block diagram illustrating peer sites, in accordance with some example embodiments. In some example embodiments, a peer site comprises a networked or online site (e.g., a website) that adopts data from another networked or online site, such as based on the GSP or CBT mechanisms discussed above, thus acting as a local site. In FIG. 5, site A 510, online site B 512, online site C 514, and online site D 516 are communicatively coupled to one another, such as via one or more networks 104. Each one of these online sites 510, 512, 514, and 516 comprises a network-based marketplace, such the network-based marketplace of networked system 102 in FIG. 1. Although, it is contemplated that each of the online sites 510, 512, 514, and 516 may comprise other types of sites as well, not just a network-based marketplace. Each one of these online sites 510, 512, 514, and 516 may comprise its own data adoption system 150, or may employ the functions of the data adoption system 150 residing on another one of the sites. In some example embodiments, each of the sites 510, 512, 514, and 516 have a corresponding top-level domain, and the top-level domain of each one of the sites 510, 512, 514, and 516 is different from the top-level domain of other sites. In some example embodiments, these online sites are foreign versions of one another, and the top-level domain of each of the online sites corresponds to a different country than the top-level domain of the other online site. For example, site A 510 may comprise a U.S. site (e.g., www.ebay.com), site B 512 may comprise a Canadian site (e.g., www.ebay.ca), site C 514 may comprise a United Kingdom site (e.g., www.ebay.co.uk), and site D 516 may comprise a German site (e.g., www.ebay.de). As previously discussed, any one of these sites can adopt or inherit data, such as item listings, that originated from another one of the sites. Although FIG. 5 shows four different sites, it is contemplated that the features disclosed herein can be employed with any number of sites.

Currently, reviews submitted on a peer site for an item listing originating from that peer site are not published or otherwise made available on the local sites that adopt the item listing of that peer site. For example, in a scenario where an iPhone is originally listed in the U.S. on site A 510 with a GSP or CBT functionality option having been selected, the product reviews corresponding to that iPhone are published or otherwise made available for the item listing on the U.S. site A 510, but not published or otherwise made available for the corresponding item listing published outside of the U.S., such in Canada on site B 512, in the United Kingdom on site C 514, or in Germany on site D 516. As a result, the product reviews corresponding to that iPhone that were submitted on the U.S. website are shown for the corresponding listings for that iPhone on the U.S. website, but not shown for the corresponding listings visible outside the U.S. (e.g., on the peer Canadian, United Kingdom, and German websites).

In some example embodiments, the data adoption system 150 is configured to publish or otherwise make available, on local sites, product reviews for item listings that originate from a peer site. In some example embodiments, the data adoption system 150 ensures that item listings that are available internationally or part of mirror sites are able to display reviews for item listings that map to those products or product IDs of those item listings that originated from the peer site. In some example embodiments, each local site can determine whether it will include reviews written, or otherwise submitted, on another site for replication-causing item listings (e.g., GSP or CBT item listings).

The features of the data adoption system 150 are particularly useful in two use cases. Although, other use cases are also within the scope of the present disclosure. The first use case involves an item listing on a peer site, where the item listing has visibility outside of the original parent site, such as a UK item listing with CBT to Canada and Germany. In some example embodiments, if a product review is written for that product ID (the product ID corresponding to the item listing) in Germany or Canada, then the UK site can decide if it will include the product review on the UK site. In some example embodiments, the data adoption system 150 provides a filter where each site can specify the sites on which reviews were written for that product ID that the site will include. For example, the UK site can specify that it will only include reviews written on Canadian site (if any for that product ID), in which case, reviews on the UK site and reviews on the Canadian site will be published or otherwise made available on the UK site.

The second use case involves item listings from other sites with visibility on their site, such as a German site displaying item listings from a UK site (e.g., due to CBT or GSP). In this case, the German site can determine whether to display or otherwise make available reviews written on the UK site or just limit its publishing of reviews to reviews written on its site, which can be configured to be the default behavior absent any other configuration to the contrary. Other use cases are also within the scope of the present disclosure.

In some example embodiments, product reviews may comprise, but are not limited to, text-based information describing a user's experience with the corresponding product, user-submitted ratings of the product (e.g., a star-based ratings system), or an image representing a percentage of users who have answered affirmatively to a user feedback question for the corresponding product (e.g., a radial graph showing that 40% agree that the battery life of the product meets expectations). Other types of product reviews are also within the scope of the present disclosure.

Figure 6:
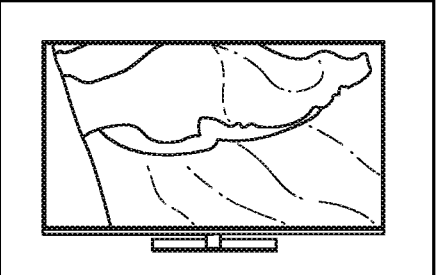
FIG. 6 illustrates a UI displaying product reviews for a product on a site, in accordance with some example embodiments.

FIG. 6 illustrates a UI 600 displaying product reviews 605 for a product on a site, in accordance with some example embodiments. In FIG. 6, an item listing for the product is displayed in the UI 600, and the product is a "Vizio 50" E500i-B1 Slim Frame LED Smart HD TV" Each product review 605 may comprise one or more aspects of the review, including, but not limited to, a rating 610 (e.g., a star-based rating), a text-based review headline 612, and a text-based review 614. Each product review 605 may also comprise an indication 616 of the author of the review and the date on which the review was authored or submitted to the corresponding site. Each product review 605 may also comprise an indication 618 of the site on which the product review 605 was originally authored or submitted. For example, the UI 600 in FIG. 6 shows three different product reviews, with one review originating from a U.S. site (www.ebay.com), one review originating from a corresponding Canadian site (www.ebay.ca), and one review originating from a corresponding German site (www.ebay.de), thereby providing an aggregation of product reviews from different sites for the same product to the user.

In some example embodiments, the data adoption system 150 is configured to present all of the product reviews authored or submitted by a user across all of the peer sites to that user on a single one of those sites, such as when the user logs into one of the sites and submits a request to associated with viewing all of the product reviews. In one scenario using the example embodiments of FIG. 5, a user who has submitted product reviews on site A 510, on site B 512, on site C 514, and on site D 516 can be presented with all of those product reviews when logging into site A 510 and viewing his or her profile. For example, the user's profile page on any one of these sites can display, or otherwise present, all of the user's product reviews to the user, thereby eliminating the burden on the user of having to log into each different site individually to view and manage their product reviews.

In some example embodiments, each site can have its own configuration specifying from which other sites to adopt or replicate the product reviews (or other data). For example, the data adoption system 150 can be configured to enable an administrator of a site to provide a configuration for adopting or replicating the product reviews from other sites, such as by generating a configuration file. In some example embodiments, the data adoption system 150 is configured to enable the administrator to set up separate configurations for different aspects or parts of a product review. For example, the administrator can set up one configuration for the text-based review portion (e.g., the text-based review headline 612 and the text-based review 614 in FIG. 6), and another configuration for the ratings portion (e.g., star-based rating 610 in FIG. 6).

For the configuration for the text-based review portion, the administrator can provide the list of sites from which text-based reviews are authored or submitted that the administrator's site will present if the administrator's site has an item listing with a product ID for which text-based reviews have been authored or submitted on those sites. For example, the administrator of a UK site can specify that the UK site will adopt the text-based review portions of any product reviews from a U.S. site and any product reviews from a Canadian site, such that the UK site will show reviews written in the U.S. (e.g., on the U.S. site) and reviews written in Canada (e.g., on the Canadian site) in addition to reviews written in the UK (e.g., on the UK site) if any are available for a product ID of an item listing on the UK site.

Similarly, for the configuration for the ratings portion, the administrator can provide the list of sites from which ratings-based reviews are authored or submitted that the administrator's site will present if the administrator's site has an item listing with a product ID for which ratings-based reviews have been authored or submitted on those sites.

It is contemplated that the product reviews can be displayed on any part of the corresponding site, whether it is the site on which the product review originated or the local site that adopted the product review. For example, the product reviews can be displayed on a "view item" page (e.g., a page of an item listing), on a "product review" page, on a "submit a review" page, on a "write a review" page, and so on. In some example embodiments, the data adoption system 150 is configured to cause the adopted or replicated product reviews to be presented on the local site in the same location (e.g., the same type of page) as the for the peer site from which the product reviews were adopted.

In some example embodiments, product reviews are boosted by the local site locale. For example, on a U.S. site, product reviews originally authored or submitted on the U.S. site can be given preference in terms of their visibility (e.g., display position, such as where in a list of produce reviews a product review is positioned) over product reviews adopted from other sites. A product review can also be boosted by other factors, such as its determined relevancy based on a relevancy logic (e.g., helpfulness of the product review, recency of the product review).

In one example, a German site has a reviews configuration as including reviews from the German site and reviews from a UK site, as well as a ratings configuration as including ratings from the German site and reviews from the UK site. In this example, for a U.S. item listing mapped to a U.S. product ID which had 4 stars based on 10 ratings and 6 reviews all of which were written on the U.S. site, where the item listing is visible on the German site (e.g., due to GSP or CBT), the German site will not show any of the product reviews from the U.S. site, as the configuration does not include the U.S. site as a site from which to adopt reviews. In some example embodiments, the German site will instead enable a user to be the first to write a product review on the German site for the corresponding product. When a user of the German site selects an option to be the first to write a review, since it is for and based on a U.S. product ID and the U.S. site is not an acceptable site for the German site in the configuration, the U.S. reviews will not be shown to the user on the German site. Instead, the German site will only show reviews, ratings and aspects authored or submitted on the German site or the UK site and boosted by the German site.

In another example, a German site has a reviews configuration as including reviews from the German site, reviews from the UK site, and reviews from the U.S. site, as well as a ratings configuration as including ratings from the German site, ratings from the UK site, and ratings from the U.S. site. In this example, for a U.S. item listing mapped to a U.S. product ID, where the U.S. item listing is visible on German site (e.g., due to GSP or CBT), if the U.S. product ID has 4 stars based on 100 ratings and 60 reviews, where there are 70 ratings having 3 stars and 35 reviews authored on the U.S. site, 10 ratings having 4 stars and 10 reviews authored on the UK site, and 20 ratings having 3.5 stars and 15 reviews authored on the Canadian site, then the German site will show an approximately 3.5 star rating based on 80 ratings (70 ratings from the U.S. site and 10 ratings from the UK site) and 45 reviews (35 reviews from the U.S. site and 10 reviews from the UK site).

In some example embodiments, a user can select a selectable "Write a Review" option (e.g., a selectable graphical user interface element) for the item listing in order to write and submit a product review for a product of an item listing.

In some example embodiments, when a user selects a "Write a Review" option in association with an item listing (e.g., from a view item page for the item listing), then, if the ratings configuration includes the site that the item listing product ID is associated with, then the aspects associated with the product ID and the site it is associated with will be shown in the original site's locale. This review will be recorded as written on the site on which the user wrote the review, but the other aspects will be from the product ID site. For example, for a German site having a reviews configuration that includes product reviews from Germany and the U.S., for a U.S. item listing (adopted to a U.S. product ID), the German site will show the U.S. aspects. The review written on the German site will be in German, but the other aspects (e.g., description, price, etc.) will be from the U.S. site. These original aspects will be shown to the user when the user edits the review irrespective of the site the user is on.

In some example embodiments, when a user selects a "Write a Review" option in association with an item listing (e.g., from a view item page for the item listing), then, if the reviews configuration for the site on which the "Write a Review" option is being selected does not include the site that the corresponding item listing is being adopted to, then no aspects will be shown in the "Write a Review" page, and, therefore, no aspects will be recorded against the product review. For example, for a German site having a reviews configuration only specifying the German site, for a U.S. item listing (adopted to a U.S. product ID) shown on the German site, the German site will not show the U.S. aspects. When the user edits this review in the future, irrespective of the site the user is on, The German site will not show the U.S. aspects.

In some example embodiments, the data adoption system 150 ensures that a user is restricted to writing only one review per product ID, irrespective of the site the user is on. For example, if a user has already submitted a product review for a product ID on a site, when the user clicks on "Write a Review" option on another site, if a review already exists for that product ID, then the user will be presented with an "Edit a Review" option or screen with an informational message and be prompted to edit previous product reviews of the user that the user submitted from any related sites. In some example embodiments, when a user writes a review for a product for the first time, the data adoption system 150 records the site ID as having been "Reviewed On." This value remains constant regardless of how many times the user has edited the review on multiple other sites.

In some example embodiments, the data adoption system 150 enables a site (e.g., a site administrator) to decide if it wants to continue default behavior or show all reviews that a user has written across the different sites on the site that the user is on. If a user tries to edit a review (e.g., from the user's "Profile" page or from a "See All Reviews"), the user will not be required to be redirected to the original site. Instead, an informational message is displayed on the "Edit a Review" screen informing the user that the user is editing a review originally written on another site. A user's profile page, being controlled by a reviews configuration default setting, can show reviews only on the site that the user is on, or else read the configuration which will typically be all sites where reviews are enabled.

Figure 7:
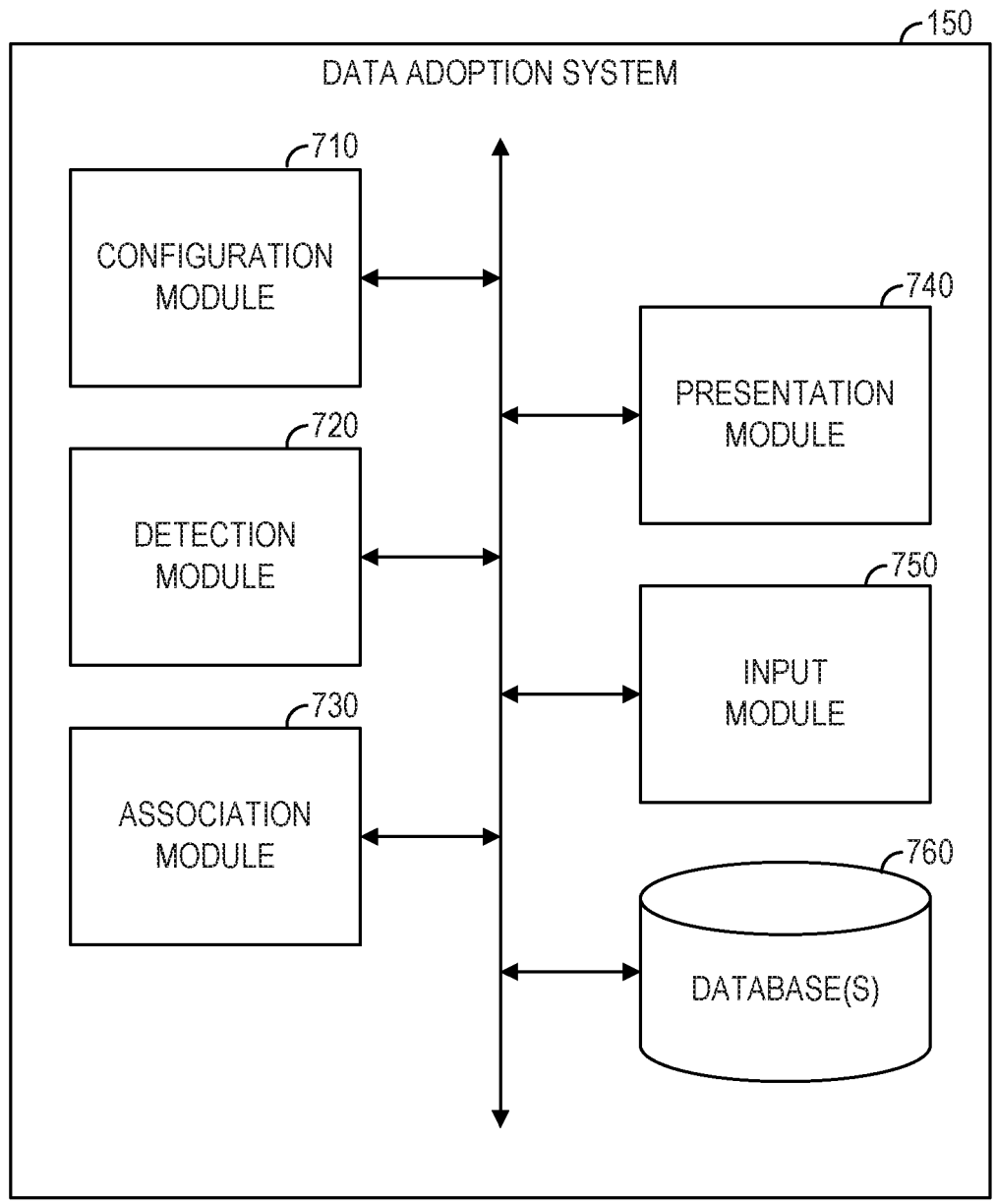
FIG. 7 is a block diagram illustrating components of a data adoption system, in accordance with some example embodiments.

FIG. 7 is a block diagram illustrating components of the data adoption system 150, in accordance with some example embodiments. The data adoption system 150 is configured to perform the operations and implement the features disclosed herein. In some example embodiments, the data adoption system 150 comprises any combination of one or more of a configuration module 710, a detection module 720, an association module 730, a presentation module 740, an input module 750, and one or more databases 760. The configuration module 710, the detection module 720, the association module 730, the presentation module 740, the input module 750, and the database(s) 760 are communicatively coupled to each other. In some example embodiments, the configuration module 710, the detection module 720, the association module 730, the presentation module 740, the input module 750, and the database(s) 760 reside on a single machine having a memory and at least one processor. In some example embodiments, one or more of the configuration module 710, the detection module 720, the association module 730, the presentation module 740, the input module 750, and the database(s) 760 reside on different machines. Database(s) 760, or a portion thereof, can be incorporated into database(s) 126 of FIG. 1.

In some example embodiments, the configuration module 710 is configured to configure a local site to adopt data from one or more peer sites. For example, the configuration module 710 may configure a Canadian site (e.g., site B 512 in FIG. 5) to adopt, inherit, or replicate data (e.g., product reviews) from one or more other corresponding sites (e.g., U.S. site A 510, UK site C 514, and German site D 516 in FIG. 5). In some example embodiments, the configuration module 710 enables a user, such as a site administrator, to input or modify a configuration file, which can be used by the configuration module 710 to implement the specified configuration.

In some example embodiments, the detection module 720 is configured to detect an update of data on the peer site(s) specified in the data adoption configuration. Such an update of data may include, but is not limited to, a submission of a new product review and a modification of a previously-submitted product review. However, other types of data are also within the scope of the present disclosure.

In some example embodiments, the association module 730 is configured to update the local site to adopt the updated data from the peer site(s) based on the data adoption configuration. For example, the association module 730 can store a product review, submitted on the U.S. site for a product ID, in association with the same product ID for the Canadian site, such that the Canadian site will present the product review to a user of the Canadian site when the user, via the Canadian site, requests a display of product reviews for that product ID.

In some example embodiments, the presentation module 740 is configured to cause product reviews, as well as other data, to be displayed to on a computing device of a user. The presentation module 740 can aggregate all of the corresponding product reviews for a specific product ID from the peer site(s) specified in the data adoption configuration, and present the aggregation of product reviews on the computing device. The presentation module 740 can also aggregate all of the product reviews authored by a single user on all of the peer sites specified in the data adoption configuration, and present the aggregation of all of the user's product reviews on the computing device.

In some example embodiments, the input module 750 is configured to enable a user to create or edit a product review, such as by providing a user interface configured to receive user input, such as text entered by the user and selections of graphical UI elements (e.g., a selectable number of stars for a star-based ratings system).

In some example embodiments, the database(s) 760 store the data adoption configurations and the product reviews.

Figure 8A:
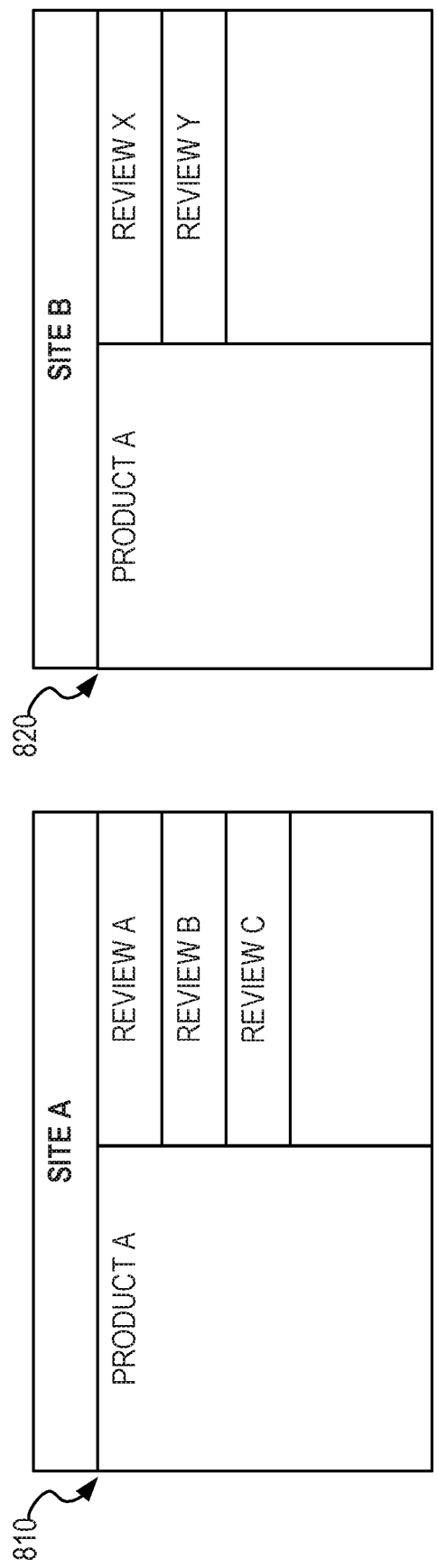
FIGS. 8A-8B illustrate a change in data on a local site based on data adopted from a peer site, in accordance with some example embodiments.
Figure 8B:
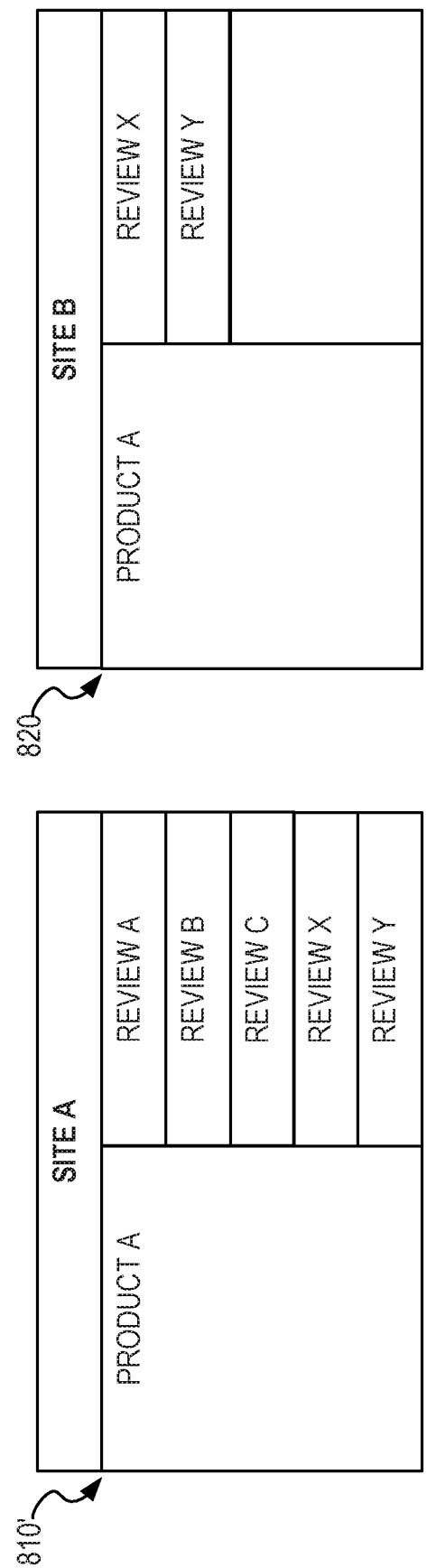

FIGS. 8A-8B illustrate a change in data on a local site based on data from a peer site, in accordance with some example embodiments. FIG. 8A shows a table 810 of product reviews (Review A, Review B, and Review C) for a single product (product A) of an item listing of the local site (Site A), with the single product having an associated product ID. In some example embodiments, the product reviews are stored in the table 810 on the local site in association with the product, such as in association with the corresponding product ID. FIG. 8A also shows a table 820 of product reviews (Review X and Review Y) for the same single product (product A) of an item listing of the peer site (Site B). In some example embodiments, the product reviews are stored in the table 820 on the peer site in association with the product ID.

FIG. 8B shows the adoption, by site A, of the product reviews from site B based on a configuration of Site A to adopt the product reviews of Site B. In FIG. 8B, the table 810' of Site A has been updated to store the product reviews from Site B (Review X and Review Y) in association with product A, such that a request on Site A to display the product reviews for product A will include the product reviews from Site B in addition to the product reviews from Site A. FIG. 8B also shows Site B not adopting the product reviews of Site A, based on a configuration of Site B that does not include the adoption of product reviews of Site A, such that a request on Site B to display the product reviews for product A will not include the product reviews from Site A.

Figure 9:
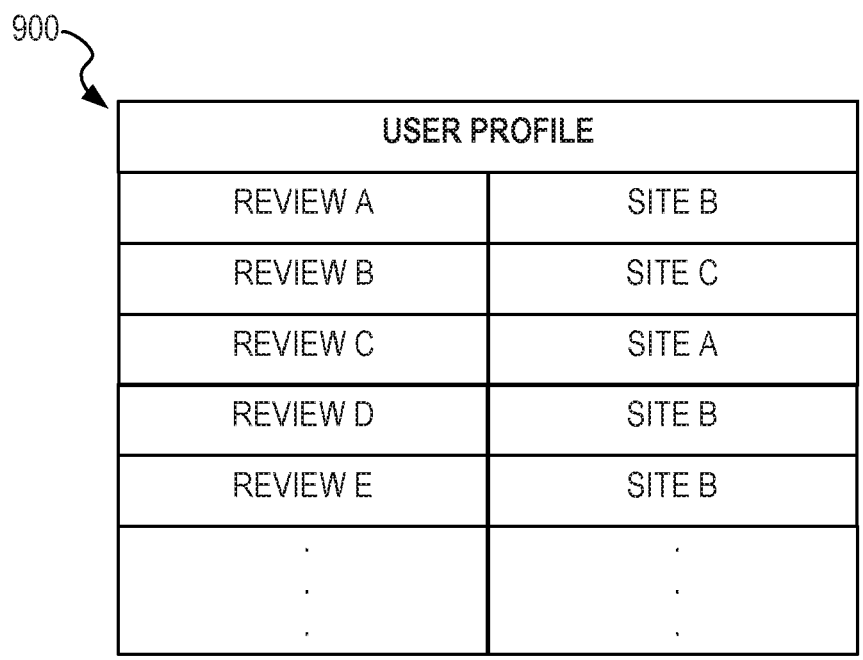
FIG. 9 illustrates a table of product reviews by a single user aggregated from different sites, in accordance with some example embodiments.

FIG. 9 illustrates a table 900 of product reviews by a single user aggregated from different sites, in accordance with some example embodiments. For example, the table 900 stores all of the product reviews that a single user authored or submitted on all of the peer sites that are included within a site's data adoption configuration. For example, if the user is viewing his or her profile on Site A, which has a data adoption configuration to adopt product reviews from Site B and Site C, then, in response to the user's request from the profile page, or from another page, on Site A to view all of the product reviews (e.g., Review A from Site B, Review B from Site C, Review C from Site A, Review D from Site B, Review E from Site B, . . . ) that the single user has authored or submitted, irrespective of the product, all of those product reviews can be provided to the user on Site A. the table 900 may be stored on database(s) 760.

Figure 10:
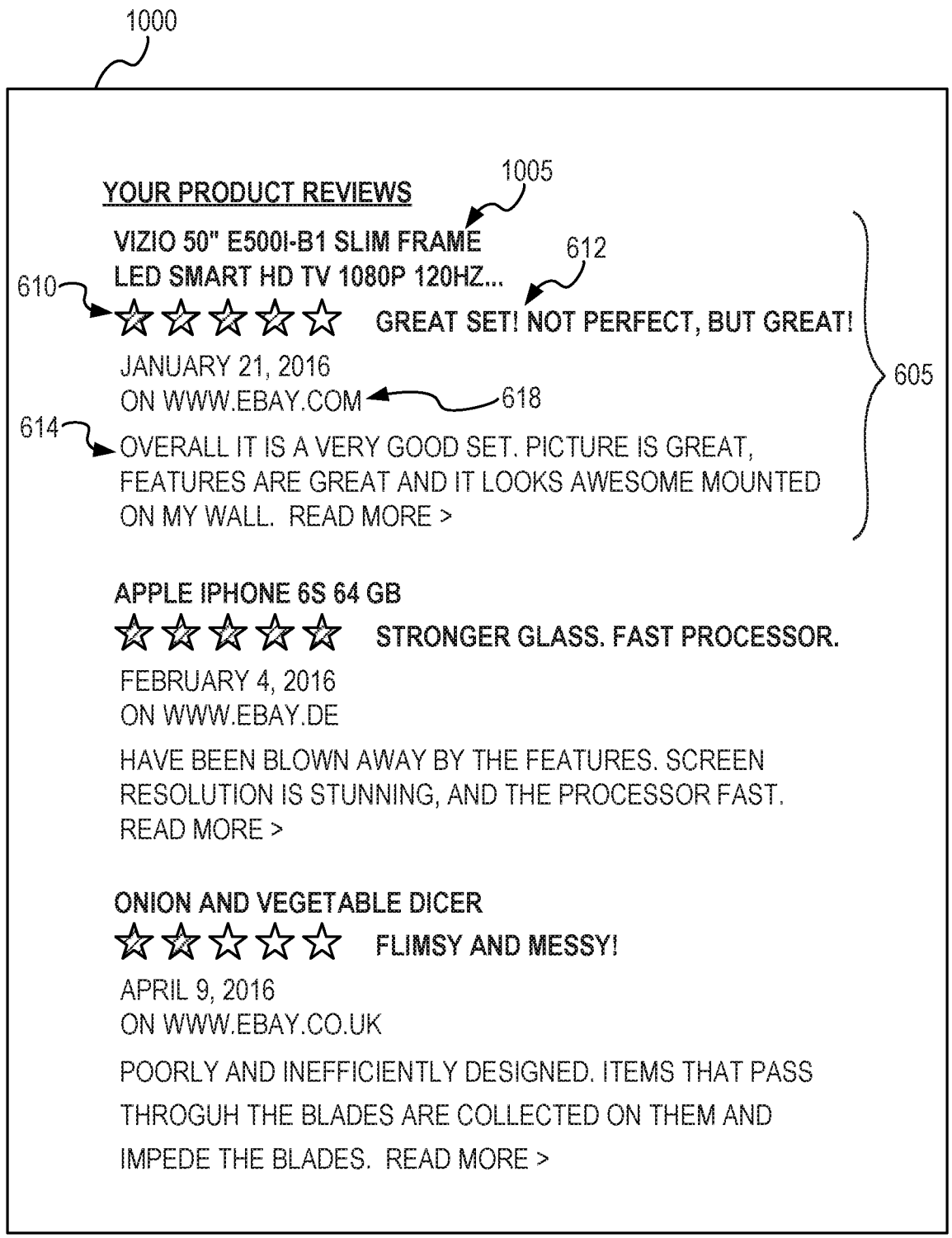
FIG. 10 illustrates a UI displaying a single user's product reviews aggregated from different sites, in accordance with some example embodiments.

FIG. 10 illustrates a UI 1000 displaying a single user's product reviews 605 aggregated from different sites, in accordance with some example embodiments. Each product review 605 may comprise one or more aspects of the review, including, but not limited to, an identification 1005 of the corresponding product, a rating 610 (e.g., a star-based rating), a text-based review headline 612, and a text-based review 614. Each product review 605 may also comprise the date on which the review was authored or submitted to the corresponding site. Each product review 605 may also comprise an indication 618 of the site on which the product review 605 was originally authored or submitted. As seen in FIG. 10, a single user's product reviews aggregated from different sites (www.ebay.com, www.ebay.de, www.ebay.co.uk) are displayed within the UI 1000.

In some example embodiments, the input module 750 is configured to receiving a request from a user to submit a new review of a product on a local site, and to determine that the user has previously submitted a review of the product on a different peer site. The input module 750 then, based on the determination that the user has previously submitted the review of the product on another site, prevents the user from submitting the new review of the product on the local site. For example, the input module 750 may redirect the user to a page informing the user that he or she has already submitted a review for the product. In some example embodiments, the input module 750 is configured to display, on the local site, a prompting for the user to edit the previously submitted review, based on the determination that the user has previously submitted the review of the product on another site.

Figure 11:
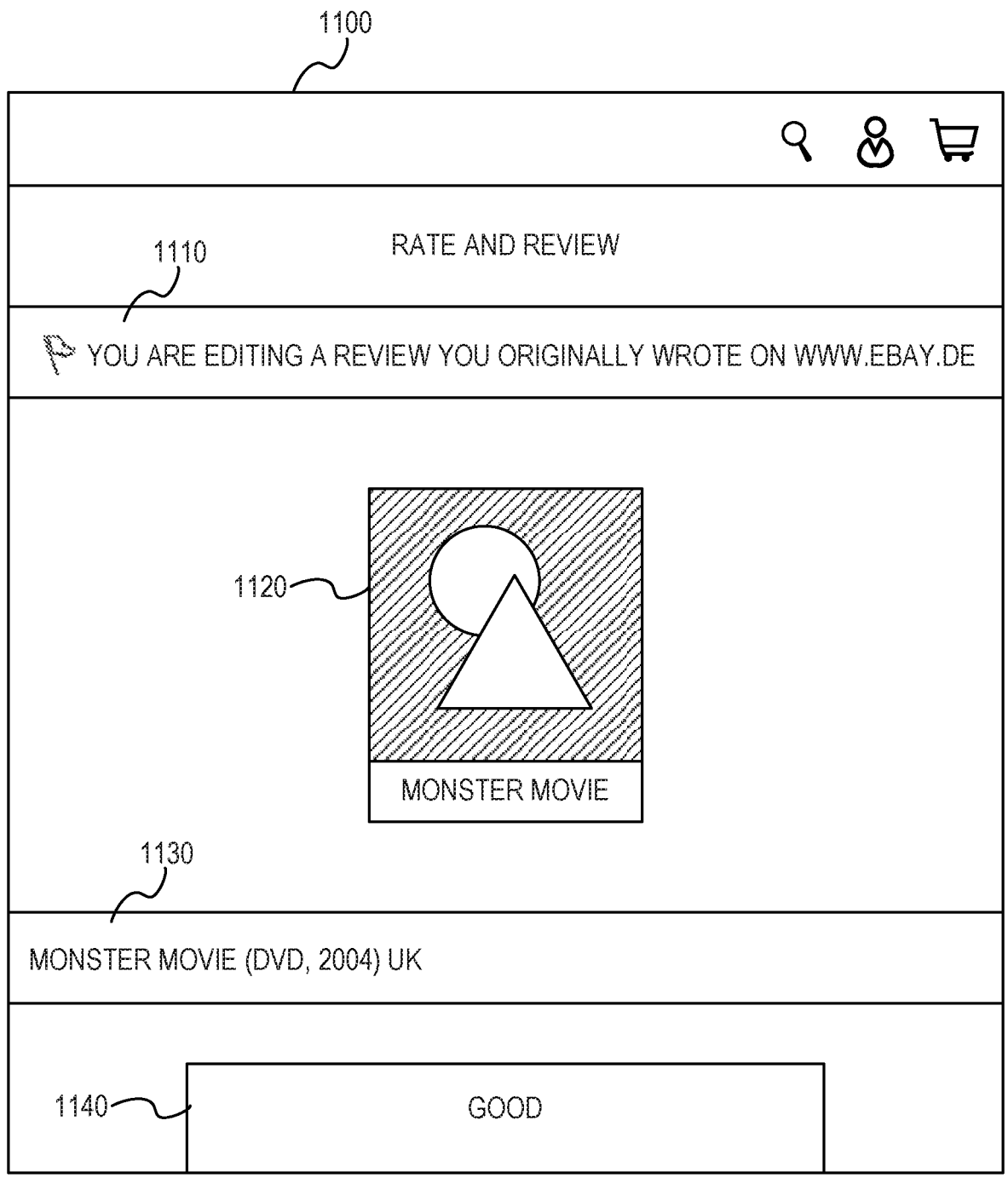
FIG. 11 illustrates a UI displaying a mobile page configured to enable a user to edit a product review, in accordance with some example embodiments.

FIG. 11 illustrates a UI 1100 displaying a mobile page configured to enable a user to edit a product review, in accordance with some example embodiments. In FIG. 11, UI 1100 is configured to enable the user to edit a product review that the user originally authored or submitted on a different site than the site on which the user is editing the product review. In some example embodiments, this mobile page is presented to the user based on the determination that the user has previously submitted a review of a product on another site. In FIG. 11, a notification 110 is displayed informing the user that he or she is editing a review that he or she originally submitted on another site. The mobile page may display identifying information about the product, such as an image 1120 and a title 1130. The mobile page may also display an indication 1140 of the user's previously submitted review 1140. In some example embodiments, the indication is configured to enable the user to modify or edit the previously submitted review in response to its selection. For example, the indication 1140 may comprise a selectable link configured to present the user with one or more input mechanisms for modifying or editing the review.

Figure 12:
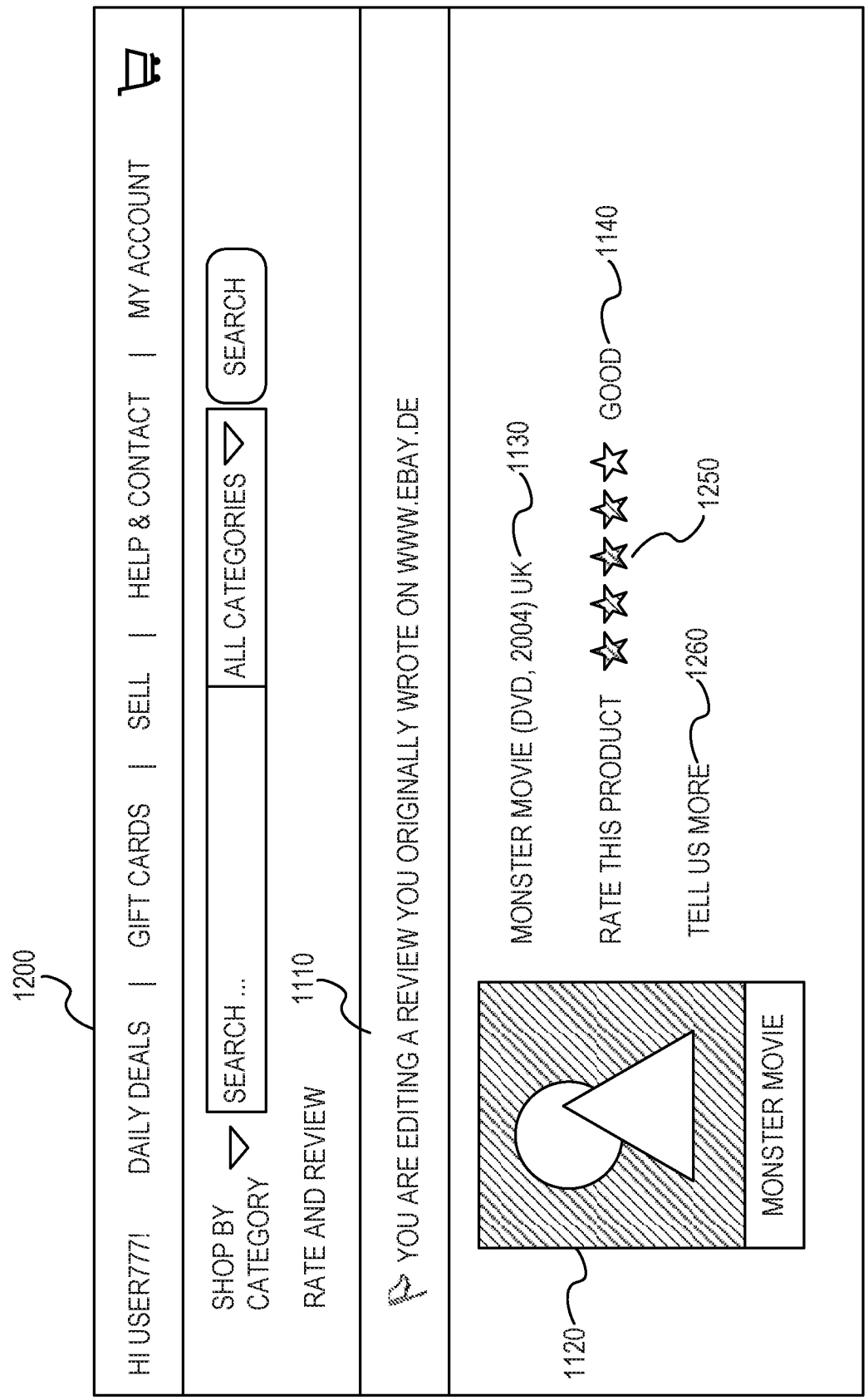
FIG. 12 illustrates a UI displaying a non-mobile page configured to enable a user to edit a product review, in accordance with some example embodiments.

FIG. 12 illustrates a UI 1200 displaying a non-mobile page configured to enable a user to edit a product review, in accordance with some example embodiments. In FIG. 12, UI 1200 is configured to enable the user to edit a product review that the user originally authored or submitted on a different site than the site on which the user is editing the product review. In some example embodiments, this mobile page is presented to the user based on the determination that the user has previously submitted a review of a product on another site. In FIG. 12, a notification 110 is displayed informing the user that he or she is editing a review that he or she originally submitted on another site. The mobile page may display identifying information about the product, such as an image 1120 and a title 1130. The mobile page may also display one or more indications of the user's previously submitted review. Such indications may include, but are not limited to, indication 1140 corresponding to a text-based review and indication 1250 corresponding to a rating-based review. In some example embodiments, the indications are configured to enable the user to modify or edit the previously submitted review in response to its selection. For example, the indications may comprise a selectable link configured to present the user with one or more input mechanisms for modifying or editing the review.

Figure 13:
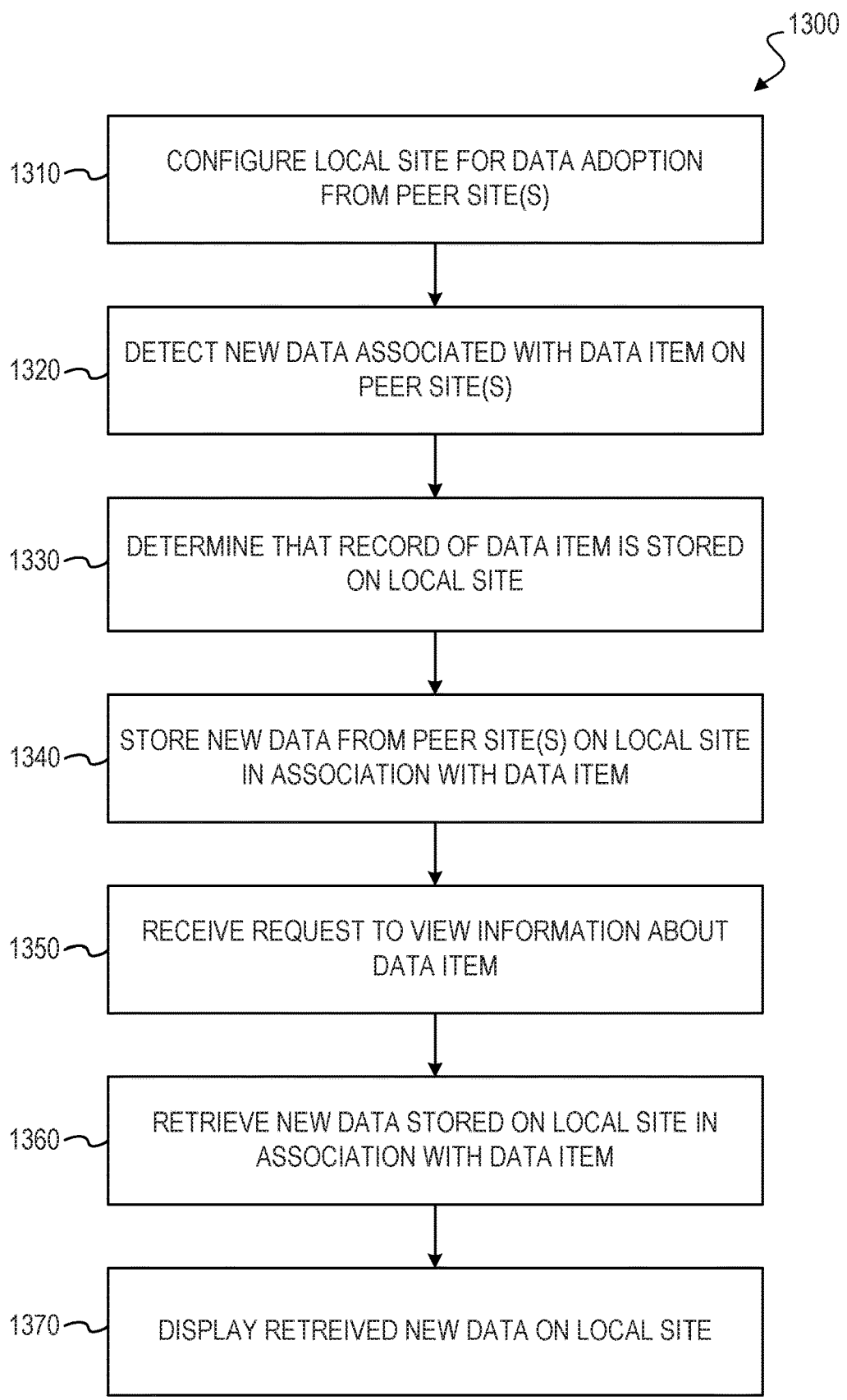
FIG. 13 is a flowchart illustrating a method of adopting data across different sites, in accordance with some example embodiments.

FIG. 13 is a flowchart illustrating a method 1300 of managing data for peer sites, in accordance with some example embodiments. The operations of method 1300 can be performed by a system or modules of a system. The operations of method 1300 can be performed by processing logic that can comprise hardware (e.g., circuitry, dedicated logic, programmable logic, microcode, etc.), software (e.g., instructions run on a processing device), or a combination thereof. In one example embodiment, the method 1300 is performed by data adoption system 150 of FIGS. 1 and 7, or any combination of one or more of its components or modules, as described above.

At operation 1310, the data adoption system 150 configures a local site (e.g., a networked site) to adopt data from one or more peer sites (e.g., one or more other networked sites). In some example embodiments, the local site and each one of the one or more peer sites have different top-level domains from one another. In some example embodiments, the top-level domains of each one of the one or more peer sites corresponds to a different country than the top-level domain of the local site. In some example embodiments, the data adoption system 150 configures the local site to adopt data of a first type from the peer site(s), and configures the local site not to adopt data of a second type from the peer site(s), with the second type being different from the first type. In some example embodiments, the first type of data is a first type of product review (e.g., a text-based review) and the second type of data is a second type of product review (e.g., a graphic ratings-based review).

At operation 1320, the data adoption system 150 detects new data on one or more peer sites, with the new data being associated with a data item on the peer site(s). In some example embodiments, the new data comprises a review of a product and the data item comprises a product identification. For example, the data adoption system 150 may detect the creation of a new product review or the modification of an already-existing product review on the peer site(s), with the product review having a corresponding product identification.

At operation 1330, the data adoption system 150 determines that a record of the data item is being stored on the local site. At operation 1340, the data adoption system 150 stores the new data from the peer site(s) on the local site in association with the data item based on the detecting of the new data on the peer site(s) and the determination that a record of the data item is being stored on the local site. In some example embodiments, operation 1340 comprises updating the local site to adopt updated data from the peer site(s) based on the data adoption configuration.

At operation 1350, the data adoption system 150 receives, from a computing device of a user accessing the local site, a request to view information about the data item, such as a request to view information about a particular product. At operation 1360, the data adoption system 150 retrieves the new data stored on the local site in association with the data item.

At operation 1360, the data adoption system 150 displays the retrieved new data on the local site to the user on the computing device. In some example embodiments, the data adoption system 150 determines a type of page on which the retrieved new data is displayed on the peer site(s), and displays the retrieved new data on the same type of page on the local site. In some example embodiments, the data adoption system 150 determines a position in which to display the retrieved new data on the local site, with the position being based at least in part on the new data having originated from the peer site(s), and displays the retrieved new data in the determined position on the local site. For example, the data adoption system 150 may give priority in display position to data (e.g., a review of a product) originating from the local site over data originating from the peer site(s), such as by displaying the data originating from the local site in a position higher in a list of data (e.g. a list of product reviews) than data originating from the peer site(s).

It is contemplated that the operations of method 1300 can incorporate any of the other features disclosed herein.

Figure 14:
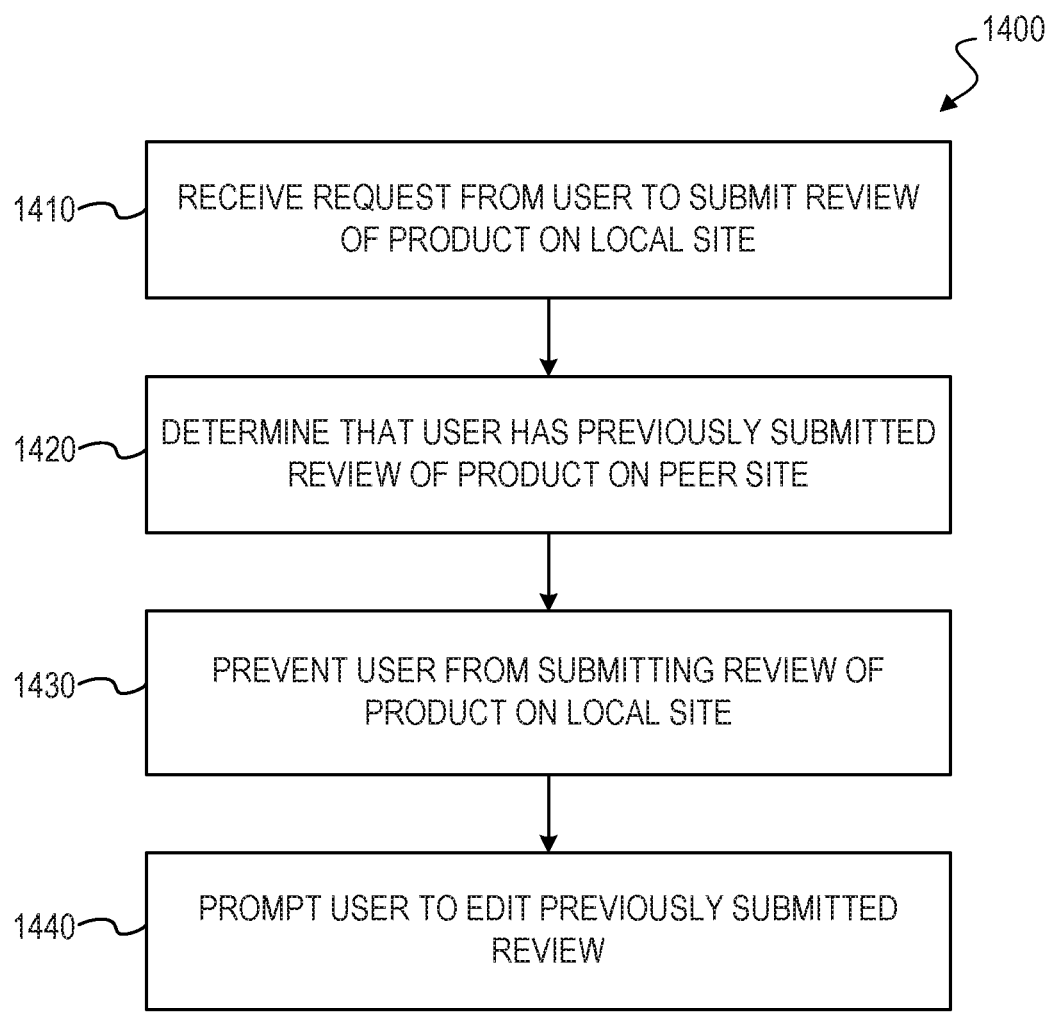
FIG. 14 is a flowchart illustrating a method of using adopted data, in accordance with some example embodiments.

FIG. 14 is a flowchart illustrating a method 1400 of using adopted data, in accordance with some example embodiments. The operations of method 1400 can be performed by a system or modules of a system. The operations of method 1400 can be performed by processing logic that can comprise hardware (e.g., circuitry, dedicated logic, programmable logic, microcode, etc.), software (e.g., instructions run on a processing device), or a combination thereof. In one example embodiment, the method 1400 is performed by data adoption system 150 of FIGS. 1 and 6, or any combination of one or more of its components or modules, as described above.

At operation 1410, the data adoption system 150 receives, from a user on a computing device accessing the local site, a request to submit a new review of a product. At operation 1420, the data adoption system 150 determines that the user has previously submitted a review of the product on one or more peer sites. At operation 1430, the data adoption system, based on the determination that the user has previously submitted the review of the product on the peer site(s), prevents the user from submitting the new review of the product on the local site. At operation 1440, the data adoption system 150 displays a prompting on the local site for the user to edit the previously submitted review based on the determination that the user has previously submitted the review of the product on the peer site(s).

It is contemplated that the operations of method 1400 can incorporate any of the other features disclosed herein. For example, any combination of one or more of operations 1410, 1420, 1430, and 1440 in FIG. 14 may be performed before, during, or after the performance of any one of operations 1310, 1320, 1330, 1340, 1350, 1360, and 1370 in FIG. 13.

It is contemplated that any features of any embodiments disclosed herein can be combined with any other features of any other embodiments disclosed herein. Accordingly, these any such hybrid embodiments are within the scope of the present disclosure.

By preventing a user from submitting multiple reviews for the same product, the data adoption system 150 can significantly reduce the consumption of electronic resources of a networked site. For example, such prevention techniques help avoid storing redundant information, thereby reducing the amount of storage space that is consumed. Other technical benefits may also result from the features of the present disclosure.

Figure 15:
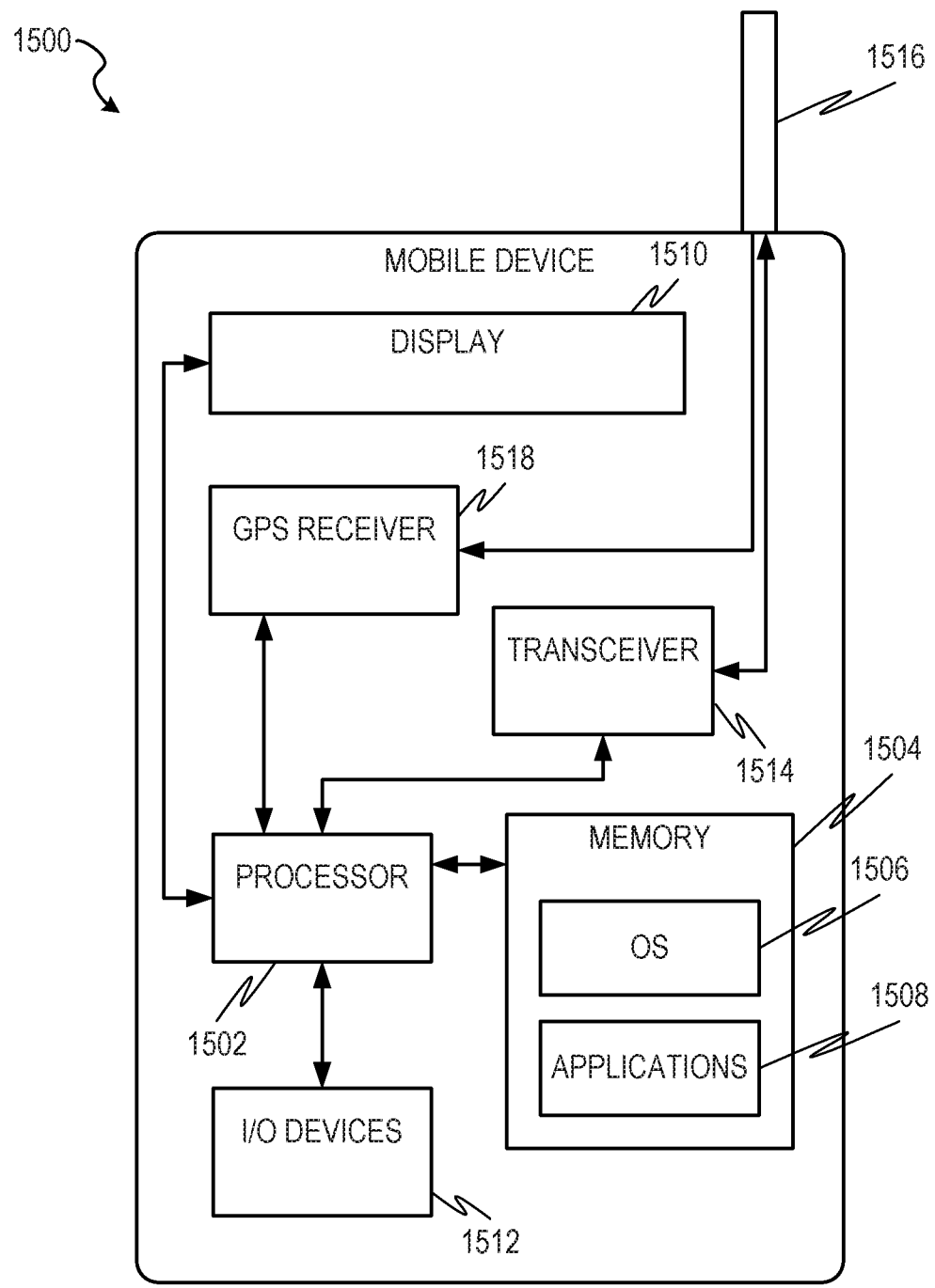
FIG. 15 is a block diagram illustrating a mobile device, in accordance with some example embodiments.

FIG. 15 is a block diagram illustrating a mobile device 1500, in accordance with some example embodiments. The mobile device 1500 can include a processor 1502. The processor 1502 can be any of a variety of different types of commercially available processors suitable for mobile devices 1500 (for example, an XScale architecture microprocessor, a Microprocessor without Interlocked Pipeline Stages (MIPS) architecture processor, or another type of processor). A memory 1504, such as a random access memory (RAM), a Flash memory, or other type of memory, is typically accessible to the processor 1502. The memory 1504 can be adapted to store an operating system (OS) 1506, as well as application programs 1508, such as a mobile location enabled application that can provide LBSs to a user. The processor 1502 can be coupled, either directly or via appropriate intermediary hardware, to a display 1510 and to one or more input/output (I/O) devices 1512, such as a keypad, a touch panel sensor, a microphone, and the like. Similarly, in some example embodiments, the processor 1502 can be coupled to a transceiver 1514 that interfaces with an antenna 1516. The transceiver 1514 can be configured to both transmit and receive cellular network signals, wireless data signals, or other types of signals via the antenna 1516, depending on the nature of the mobile device 1500. Further, in some configurations, a GPS receiver 1518 can also make use of the antenna 1516 to receive GPS signals.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1-14 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the features of the present disclosure in different contexts from the disclosure contained herein.

Figure 16:
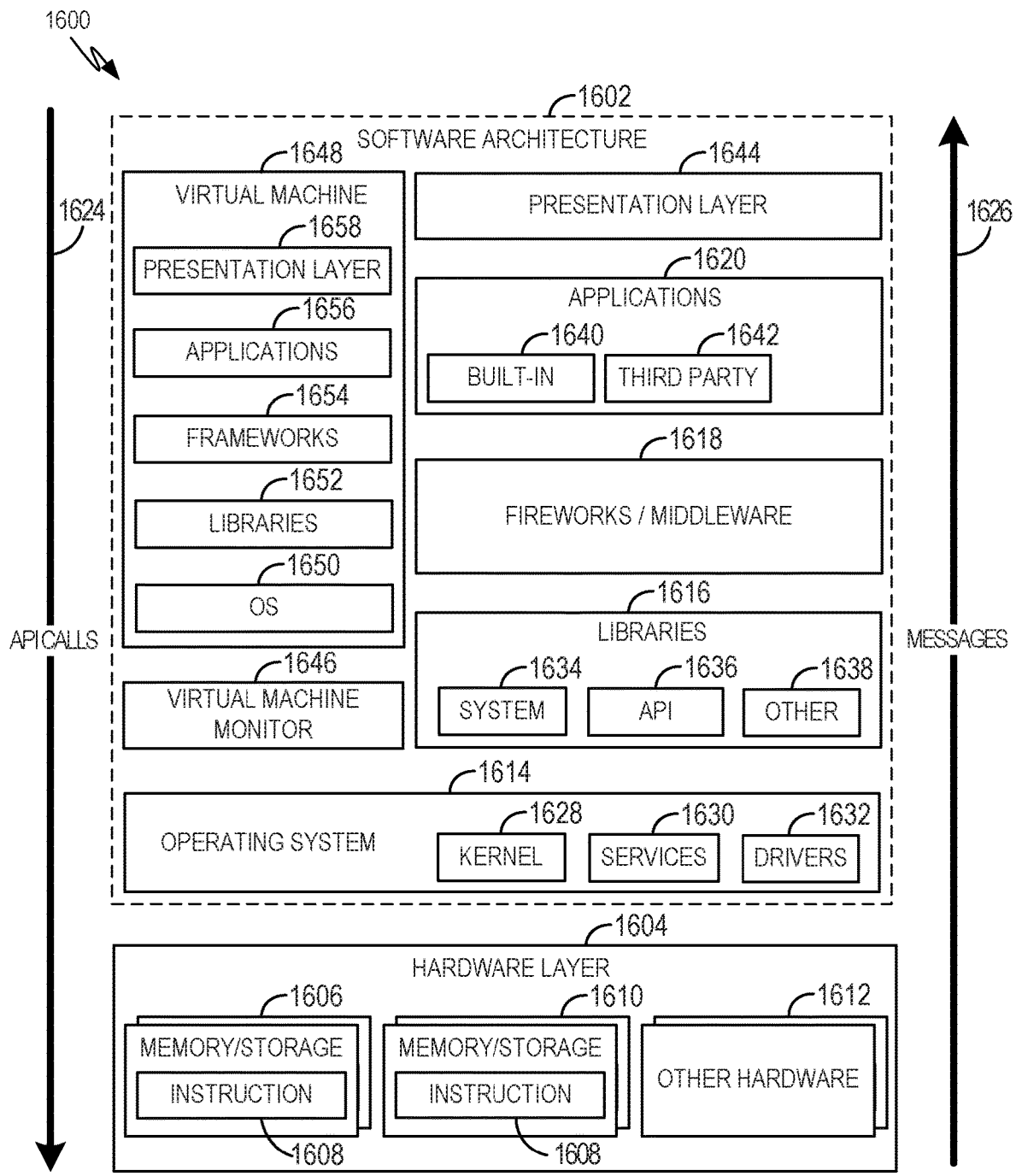
FIG. 16 is a block diagram illustrating a representative software architecture, in accordance with some example embodiments.

FIG. 16 is a block diagram 1600 illustrating a representative software architecture 1602, which may be used in conjunction with various hardware architectures herein described. FIG. 16 is merely a non-limiting example of a software architecture 1602 and it will be appreciated that many other architectures may be implemented to facilitate the functionality described herein. The software architecture 1602 may be executing on hardware such as a machine 1700 of FIG. 17 that includes, among other things, processors 1610, memory/storage 1630, and I/O components 1650. A representative hardware layer 1604 is illustrated in FIG. 16 and can represent, for example, the machine 1700 of FIG. 17. The representative hardware layer 1604 comprises one or more processing units 1606 having associated executable instructions 1608. The executable instructions 1608 represent the executable instructions of the software architecture 1602, including implementation of the methods, modules, and so forth of FIGS. 4-13. The hardware layer 1604 also includes memory and/or storage modules 1610, which also have the executable instructions 1608. The hardware layer 1604 may also comprise other hardware 1612, which represents any other hardware of the hardware layer 1604, such as the other hardware illustrated as part of the machine 1600.

In the example architecture of FIG. 16, the software architecture 1602 may be conceptualized as a stack of layers where each layer provides particular functionality. For example, the software architecture 1602 may include layers such as an operating system 1614, libraries 1616, frameworks/middleware 1618, applications 1620, and a presentation layer 1644. Operationally, the applications 1620 and/or other components within the layers may invoke application programming interface (API) calls 1624 through the software stack and receive a response, returned values, and so forth, illustrated as messages 1626, in response to the API calls 1624. The layers illustrated are representative in nature and not all software architectures have all layers. For example, some mobile or special purpose operating systems may not provide a frameworks/middleware 1618, while others may provide such a layer. Other software architectures may include additional or different layers.

The operating system 1614 may manage hardware resources and provide common services. The operating system 1614 may include, for example, a kernel 1628, services 1630, and drivers 1632. The kernel 1628 may act as an abstraction layer between the hardware and the other software layers. For example, the kernel 1628 may be responsible for memory management, processor management (e.g., scheduling), component management, networking, security settings, and so on. The services 1630 may provide other common services for the other software layers. The drivers 1632 may be responsible for controlling or interfacing with the underlying hardware. For instance, the drivers 1632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1616 may provide a common infrastructure that may be utilized by the applications 1620 or other components or layers. The libraries 1616 typically provide functionality that allows other software modules to perform tasks in an easier fashion than to interface directly with the underlying operating system 1614 functionality (e.g., kernel 1628, services 1630, and/or drivers 1632). The libraries 1616 may include system libraries 1634 (e.g., C standard library) that may provide functions such as memory allocation functions, string manipulation functions, mathematic functions, and the like. In addition, the libraries 1616 may include API libraries 1636 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1616 may also include a wide variety of other libraries 1638 to provide many other APIs to the applications 1620 and other software components/modules.

The frameworks/middleware 1618 may provide a higher-level common infrastructure that may be utilized by the applications 1620 or other software components/modules.

For example, the frameworks/middleware 1618 may provide various graphic user interface (GUI) functions, high-level resource management, high-level location services, and so forth. The frameworks/middleware 1618 may provide a broad spectrum of other APIs that may be utilized by the applications 1620 or other software components/modules, some of which may be specific to a particular operating system or platform.

The applications 1620 include built-in applications 1640 or third party applications 1642. Examples of representative built-in applications 1640 may include, but are not limited to, a contacts application, a browser application, a book reader application, a location application, a media application, a messaging application, or a game application. The third party applications 1642 may include any of the built in applications 1640 as well as a broad assortment of other applications. In a specific example, the third party application 1642 (e.g., an application developed using the Android™ or iOS™ software development kit (SDK) by an entity other than the vendor of the particular platform) may be mobile software running on a mobile operating system such as iOS™ Android™, Windows® Phone, or other mobile operating systems. In this example, the third party application 1642 may invoke the API calls 1624 provided by the mobile operating system such as the operating system 1614 to facilitate functionality described herein.

The applications 1620 may utilize built-in operating system functions (e.g., kernel 1628, services 1630, and/or drivers 1632), libraries (e.g., system libraries 1634, API libraries 1636, and other libraries 1638), and frameworks/middleware 1618 to create user interfaces to interact with users of the system. Alternatively, or additionally, in some systems, interactions with a user may occur through a presentation layer, such as the presentation layer 1644. In these systems, the application/module "logic" can be separated from the aspects of the application/module that interact with a user.

Some software architectures utilize virtual machines. In the example of FIG. 16, this is illustrated by a virtual machine 1648. A virtual machine creates a software environment where applications/modules can execute as if they were executing on a hardware machine (e.g., the machine of FIG. 17). A virtual machine is hosted by a host operating system (e.g., operating system 1614) and typically, although not always, has a virtual machine monitor 1646, which manages the operation of the virtual machine 1648 as well as the interface with the host operating system (e.g., operating system 1614). A software architecture executes within the virtual machine 1648 such as an operating system 1650, libraries 1652, frameworks 1654, applications 1656, or presentation layer 1658. These layers of software architecture executing within the virtual machine 1648 can be the same as corresponding layers previously described or may be different.

Figure 17:
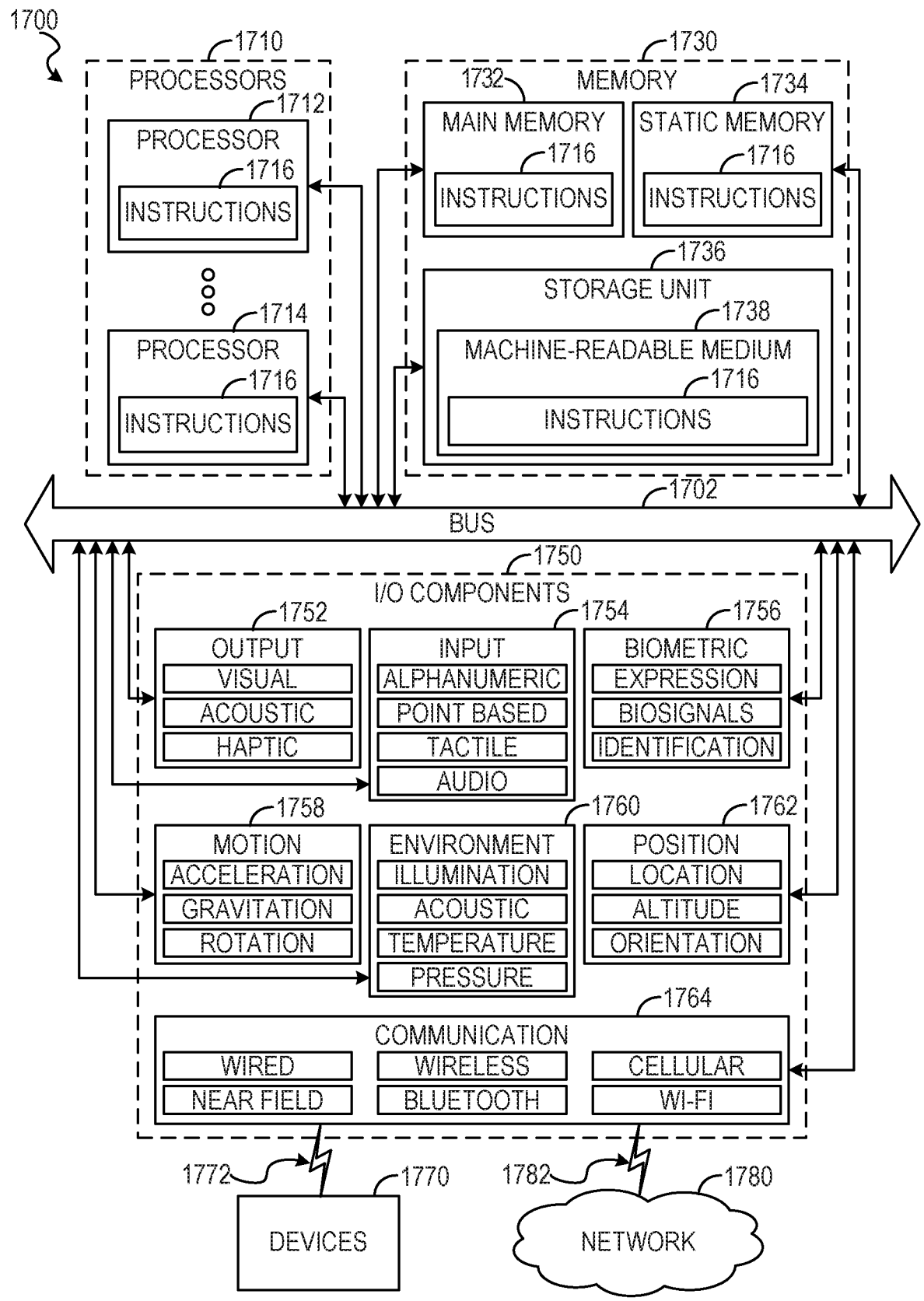
FIG. 17 is a diagrammatic representation of a machine in the form of a computer system within which a set of instructions may be executed for causing the machine to perform any one or more of the methodologies discussed herein, according to an example embodiment.

FIG. 17 is a block diagram illustrating components of a machine 1700, according to some example embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein may be executed. For example the instructions may cause the machine to execute the flow diagram of FIG. 13. Additionally, or alternatively, the instructions may implement any combination of one or more of the modules of FIG. 6, and so forth. The instructions transform the general, non-programmed machine into a particular machine programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by machine 1700. Further, while only a single machine 1700 is illustrated, the term "machine" shall also be taken to include a collection of machines 1700 that individually or jointly execute the instructions 1716 to perform any one or more of the methodologies discussed herein.

The machine 1700 may include processors 1710, memory 1730, and I/O components 1750, which may be configured to communicate with each other such as via a bus 1702. In an example embodiment, the processors 1710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1712 and processor 1714 that may execute instructions 1716. The term "processor" is intended to include multi-core processor that may comprise two or more independent processors (sometimes referred to as "cores") that may execute instructions contemporaneously. Although FIG. 17 shows multiple processors, the machine 1700 may include a single processor with a single core, a single processor with multiple cores (e.g., a multi-core process), multiple processors with a single core, multiple processors with multiples cores, or any combination thereof.

The memory/storage 1730 may include a memory 1732, such as a main memory, or other memory storage, and a storage unit 1736, both accessible to the processors 1710 such as via the bus 1702. The storage unit 1736 and memory 1732 store the instructions 1716 embodying any one or more of the methodologies or functions described herein. The instructions 1716 may also reside, completely or partially, within the memory 1732, within the storage unit 1736, within at least one of the processors 1710 (e.g., within the processor's cache memory), or any suitable combination thereof, during execution thereof by the machine 1700. Accordingly, the memory 1732, the storage unit 1736, and the memory of processors 1710 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1716. The term "machine-readable medium" shall also be taken to include any medium, or combination of multiple media, that is capable of storing instructions (e.g., instructions 1716) for execution by a machine (e.g., machine 1700), such that the instructions, when executed by one or more processors of the machine 1700 (e.g., processors 1710), cause the machine 1700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1750 may include a wide variety of components to receive input, provide output, produce output, transmit information, exchange information, capture measurements, and so on. The specific I/O components 1750 that are included in a particular machine will depend on the type of machine. For example, portable machines such as mobile phones will likely include a touch input device or other such input mechanisms, while a headless server machine will likely not include such a touch input device. It will be appreciated that the I/O components 1750 may include many other components that are not shown in FIG. 17. The I/O components 1750 are grouped according to functionality merely for simplifying the following discussion and the grouping is in no way limiting. In various example embodiments, the I/O components 1750 may include output components 1752 and input components 1754. The output components 1752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1750 may include biometric components 1756, motion components 1758, environmental components 1760, or position components 1762 among a wide array of other components. For example, the biometric components 1756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1758 may include acceleration sensor components (e.g., accelerometer), gravitation sensor components, rotation sensor components (e.g., gyroscope), and so forth. The environmental components 1760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1750 may include communication components 1764 operable to couple the machine 1700 to a network 1780 or devices 1770 via coupling 1782 and coupling 1772 respectively. For example, the communication components 1764 may include a network interface component or other suitable device to interface with the network 1780. In further examples, communication components 1764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1770 may be another machine or any of a wide variety of peripheral devices (e.g., a peripheral device coupled via a Universal Serial Bus (USB)).

Moreover, the communication components 1764 may detect identifiers or include components operable to detect identifiers. For example, the communication components 1764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1764, such as, location via Internet Protocol (IP) geo-location, location via Wi-Fi® signal triangulation, location via detecting a NFC beacon signal that may indicate a particular location, and so forth.

In various example embodiments, one or more portions of the network 1780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1780 or a portion of the network 1780 may include a wireless or cellular network and the coupling 1782 may be a Code Division Multiple Access (CDMA) connection, a Global System for Mobile communications (GSM) connection, or other type of cellular or wireless coupling. In this example, the coupling 1782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1716 may be transmitted or received over the network 1780 using a transmission medium via a network interface device (e.g., a network interface component included in the communication components 1764) and utilizing any one of a number of well-known transfer protocols (e.g., hypertext transfer protocol (HTTP)). Similarly, the instructions 1716 may be transmitted or received using a transmission medium via the coupling 1772 (e.g., a peer-to-peer coupling) to devices 1770. The term "transmission medium" shall be taken to include any intangible medium that is capable of storing, encoding, or carrying instructions 1716 for execution by the machine 1700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
at least one hardware processor; and
a non-transitory computer-readable medium storing executable instructions that, when executed, cause the at least one hardware processor to perform operations comprising:
configuring a first networked site to adopt data from one or more other networked sites different from the first networked site, the configuring the first networked site to adopt data from the one or more other networked sites comprising:
configuring the first networked site to adopt data of a first type of presentation format from the one or more other networked sites; and
configuring the first networked site not to adopt data of a second type of presentation format from the one or more other networked sites, the second type of presentation format being different from the first type of presentation format;
detecting new data on at least one of the one or more other networked sites, the new data being associated with a data item on the at least one of the one or more other networked sites;
determining that a record of the data item is being stored on the first networked site; and
storing the new data from the at least one of the one or more other networked sites on the first networked site in association with the data item based on the detecting of the new data on the at least one of the at least one of the one or more other networked sites and the determining that a record of the data item is being stored on the first networked site.

2. The system of claim 1, wherein the first type of presentation format is a text-based presentation format, and the second type of presentation format is not a text-based presentation format.

3. The system of claim 1, wherein the first type of presentation format is not a graphics-based presentation format, and the second type of presentation format is a graphics-based presentation format.

4. The system of claim 1, wherein the first type of presentation format is a text-based presentation format, and the second type of presentation format is a graphics-based presentation format.

5. The system of claim 1, wherein the data of the first type of presentation format is a product review.

6. The system of claim 1, wherein the data of the second type of presentation format is a product review.

7. The system of claim 1, wherein the data of the first type of presentation format and the data of the second type of presentation format are product reviews.

8. The system of claim 1, wherein the data of the first type of presentation format is a text-based product review.

9. The system of claim 1, wherein the data of the second type of presentation format is a graphics-based product review.

10. The system of claim 1, wherein the data of the first type of presentation format is a text-based product review, and the data of the second type of presentation format is a graphics-based product review.

11. A computer-implemented method comprising:
configuring, by at least one hardware processor, a first networked site to adopt data from one or more other networked sites different from the first networked site, the configuring the first networked site to adopt data from the one or more other networked sites comprising:
configuring the first networked site to adopt data of a first type of presentation format from the one or more other networked sites; and
configuring the first networked site not to adopt data of a second type of presentation format from the one or more other networked sites, the second type of presentation format being different from the first type of presentation format;
detecting, by the at least one hardware processor, new data on at least one of the one or more other networked sites, the new data being associated with a data item on the at least one of the one or more other networked sites;
determining, by the at least one hardware processor, that a record of the data item is being stored on the first networked site; and
storing, by the at least one hardware processor, the new data from the at least one of the one or more other networked sites on the first networked site in association with the data item based on the detecting of the new data on the at least one of the at least one of the one or more other networked sites and the determining that a record of the data item is being stored on the first networked site.

12. The computer-implemented method of claim 11, wherein the first type of presentation format is a text-based presentation format, and the second type of presentation format is not a text-based presentation format.

13. The computer-implemented method of claim 11, wherein the first type of presentation format is not a graphics-based presentation format, and the second type of presentation format is a graphics-based presentation format.

14. The computer-implemented method of claim 11, wherein the first type of presentation format is a text-based presentation format, and the second type of presentation format is a graphics-based presentation format.

15. The computer-implemented method of claim 11, wherein the data of the first type of presentation format is a product review.

16. The computer-implemented method of claim 11, wherein the data of the second type of presentation format is a product review.

17. The computer-implemented method of claim 11, wherein the data of the first type of presentation format and the data of the second type of presentation format are product reviews.

18. The computer-implemented method of claim 11, wherein the data of the first type of presentation format is a text-based product review.

19. The computer-implemented method of claim 11, wherein the data of the second type of presentation format is a graphics-based product review.

20. A non-transitory computer-readable medium storing executable instructions that, when executed, cause the at least one hardware processor to perform operations comprising:
configuring a first networked site to adopt data from one or more other networked sites different from the first networked site, the configuring the first networked site to adopt data from the one or more other networked sites comprising:
configuring the first networked site to adopt data of a first type of presentation format from the one or more other networked sites; and
configuring the first networked site not to adopt data of a second type of presentation format from the one or more other networked sites, the second type of presentation format being different from the first type of presentation format;

detecting new data on at least one of the one or more other networked sites, the new data being associated with a data item on the at least one of the one or more other networked sites;

determining that a record of the data item is being stored on the first networked site; and storing the new data from the at least one of the one or more other networked sites on the first networked site in association with the data item based on the detecting of the new data on the at least one of the at least one of the one or more other networked sites and the determining that a record of the data item is being stored on the first networked site.

* * * * *